US009930927B2

(12) United States Patent
Luedecke et al.

(10) Patent No.: US 9,930,927 B2
(45) Date of Patent: Apr. 3, 2018

(54) FOOTWEAR INCLUDING LIGHTWEIGHT SOLE STRUCTURE PROVIDING ENHANCED COMFORT, FLEXIBILITY AND PERFORMANCE FEATURES

(71) Applicant: Under Armour, Inc., Baltimore, MD (US)

(72) Inventors: Tom Luedecke, Portland, OR (US); Patrick Cassiday, Portland, OR (US); David McManus, Portland, OR (US)

(73) Assignee: UNDER ARMOUR, INC., Baltimore, MD (US)

( * ) Notice: Subject to any disclaimer, the term of this patent is extended or adjusted under 35 U.S.C. 154(b) by 23 days.

(21) Appl. No.: 15/171,728

(22) Filed: Jun. 2, 2016

(65) Prior Publication Data

US 2016/0353836 A1 Dec. 8, 2016

Related U.S. Application Data

(60) Provisional application No. 62/169,924, filed on Jun. 2, 2015.

(51) Int. Cl.
*A43B 13/12* (2006.01)
*A43B 13/04* (2006.01)
(Continued)

(52) U.S. Cl.
CPC .......... *A43B 13/122* (2013.01); *A43B 13/026* (2013.01); *A43B 13/04* (2013.01);
(Continued)

(58) Field of Classification Search
CPC ..... A43B 13/026; A43B 13/12; A43B 13/122; A43B 13/125; A43B 13/127; A43B 13/18; A43B 13/181; A43B 13/185
(Continued)

(56) References Cited

U.S. PATENT DOCUMENTS 1,382,768 A 6/1921 Ferguson
1,704,187 A 3/1929 Glidden et al.
(Continued)

FOREIGN PATENT DOCUMENTS

WO 2012079646 A1 6/2012
WO 2014066940 A1 5/2014
(Continued)

OTHER PUBLICATIONS

International Search Report and Written Opinion, PCT/US2016/035481, dated Oct. 20, 2016, 13 pages.
(Continued)

*Primary Examiner* — Marie Bays
(74) *Attorney, Agent, or Firm* — Edell, Shapiro & Finnan, LLC

(57) ABSTRACT

An article of footwear includes an upper, and a sole structure including a midsole structure and an outsole structure, where the midsole structure is located between the upper and the outsole structure. The midsole structure includes a plurality of members arranged in layers within the midsole structure, the plurality of members including a first cushion member formed of a first compressible material, a second cushion member formed of a second compressible material, and a plate disposed between the first and second cushion members, where the plate includes at least one flexure groove extending along a surface of the plate that is transverse a length of the plate such that the plate is configured to bend at the flexure groove.

17 Claims, 15 Drawing Sheets

(51) Int. Cl.
- *B29D 35/12* (2010.01)
- *A43B 13/02* (2006.01)
- *A43B 13/14* (2006.01)
- *A43B 13/18* (2006.01)

(52) U.S. Cl.
CPC ............ *A43B 13/12* (2013.01); *A43B 13/127* (2013.01); *A43B 13/141* (2013.01); *A43B 13/181* (2013.01); *B29D 35/122* (2013.01)

(58) Field of Classification Search
USPC .................................. 36/25 R, 28, 30 R, 31
See application file for complete search history.

(56) References Cited

U.S. PATENT DOCUMENTS

| | | | |
|---|---|---|---|
| 2,333,303 A | 11/1943 | Enos | |
| 4,561,195 A | 12/1985 | Onoda | |
| 4,615,126 A | 10/1986 | Mathews | |
| 4,854,057 A | 8/1989 | Misevich et al. | |
| 5,940,994 A | 8/1999 | Allen | |
| 6,032,388 A | 3/2000 | Fram | |
| 6,119,373 A * | 9/2000 | Gebhard | A43B 3/14 36/103 |
| 6,237,251 B1 * | 5/2001 | Litchfield | A43B 1/0072 36/114 |
| 6,295,741 B1 | 10/2001 | Kita | |
| 6,412,196 B1 * | 7/2002 | Gross | A43B 13/026 36/102 |
| 6,438,873 B1 * | 8/2002 | Gebhard | A43B 3/14 36/103 |
| 6,557,274 B2 | 5/2003 | Litchfield et al. | |
| 6,775,930 B2 | 8/2004 | Fuerst | |
| 6,782,642 B2 | 8/2004 | Knoche et al. | |
| 6,807,752 B2 | 10/2004 | Nakano et al. | |
| 7,013,581 B2 | 3/2006 | Greene et al. | |
| 7,081,221 B2 | 7/2006 | Paratore et al. | |
| 7,168,187 B2 | 1/2007 | Robbins | |
| 7,203,985 B2 | 4/2007 | Cox | |
| 7,313,879 B2 | 1/2008 | Ward | |
| 7,401,421 B2 | 7/2008 | Brennan | |
| 7,441,346 B2 * | 10/2008 | Hardy | A43B 13/183 36/114 |
| 7,883,658 B2 | 2/2011 | Baier et al. | |
| 7,886,461 B2 | 2/2011 | Sato | |
| 7,946,059 B2 * | 5/2011 | Borel | A43B 13/026 36/28 |
| 8,029,715 B2 | 10/2011 | Fogg et al. | |
| 8,099,880 B2 | 1/2012 | Brewer et al. | |
| 8,112,909 B2 | 2/2012 | Kubo et al. | |
| 8,141,276 B2 | 3/2012 | Ellis | |
| 8,171,656 B2 | 5/2012 | Salminen et al. | |
| 8,256,147 B2 | 9/2012 | Ellis | |
| 8,291,618 B2 | 10/2012 | Ellis | |
| 8,338,697 B2 | 12/2012 | Hoya | |
| 8,460,593 B2 | 6/2013 | Fogg et al. | |
| 8,479,416 B2 | 7/2013 | Auger et al. | |
| 8,544,190 B2 * | 10/2013 | Nishiwaki | A43B 13/184 36/114 |
| 8,561,323 B2 | 10/2013 | Ellis | |
| 8,562,678 B2 | 10/2013 | Ellis | |
| 8,567,093 B2 | 10/2013 | Sato | |
| 8,567,095 B2 | 10/2013 | Ellis | |
| 8,813,391 B1 | 8/2014 | Khaitan et al. | |
| 8,893,406 B2 | 11/2014 | Auger et al. | |
| 9,055,784 B2 | 6/2015 | Peyton | |
| 2002/0092201 A1 * | 7/2002 | Kraeuter | A43B 5/00 36/25 R |
| 2003/0121179 A1 | 7/2003 | Chen | |
| 2004/0221485 A1 | 11/2004 | Pfander | |
| 2005/0126036 A1 | 6/2005 | Wu | |
| 2005/0172513 A1 | 8/2005 | Lechhart | |
| 2005/0210705 A1 * | 9/2005 | Grove | A43B 13/223 36/25 R |
| 2006/0137220 A1 * | 6/2006 | Hardy | A43B 13/183 36/28 |
| 2008/0022553 A1 * | 1/2008 | McDonald | A43B 3/0057 36/25 R |
| 2008/0216357 A1 | 9/2008 | Fogg et al. | |
| 2008/0263905 A1 | 10/2008 | Tai | |
| 2009/0019727 A1 | 1/2009 | Fenzi | |
| 2009/0044432 A1 | 2/2009 | O'Connor et al. | |
| 2009/0113758 A1 * | 5/2009 | Nishiwaki | A43B 13/10 36/88 |
| 2009/0133288 A1 | 5/2009 | Gallegos | |
| 2009/0172971 A1 | 7/2009 | Peikert | |
| 2010/0005684 A1 * | 1/2010 | Nishiwaki | A43B 7/1425 36/28 |
| 2010/0299965 A1 * | 12/2010 | Avar | A43B 5/06 36/102 |
| 2011/0167680 A1 | 7/2011 | Law | |
| 2011/0185590 A1 * | 8/2011 | Nishiwaki | A43B 5/06 36/28 |
| 2011/0219643 A1 | 9/2011 | Tai | |
| 2011/0283559 A1 * | 11/2011 | Macey | A43B 13/187 36/28 |
| 2012/0030971 A9 * | 2/2012 | Truelsen | A43B 5/06 36/30 R |
| 2012/0297641 A1 | 11/2012 | Pfister | |
| 2013/0019497 A1 * | 1/2013 | Sullivan | A43B 7/144 36/28 |
| 2013/0074371 A1 | 3/2013 | Borel et al. | |
| 2013/0160327 A1 | 6/2013 | Peyton | |
| 2013/0160332 A1 | 6/2013 | Ellis | |
| 2013/0247425 A1 | 9/2013 | Davis et al. | |
| 2014/0059883 A1 | 3/2014 | Adeagbo et al. | |
| 2015/0013182 A1 | 1/2015 | Norton | |
| 2015/0107132 A1 | 4/2015 | Takeshita | |
| 2015/0143715 A1 | 5/2015 | Auger et al. | |
| 2015/0282559 A1 * | 10/2015 | Nishiwaki | A43B 7/1425 36/31 |

FOREIGN PATENT DOCUMENTS

| | | |
|---|---|---|
| WO | 2014068169 A1 | 5/2014 |
| WO | 2014196387 A1 | 12/2014 |

OTHER PUBLICATIONS

Mizuno Wave Sayonara 2 Review. Datasheet (online), retrieved by PCT Examiner on Sep. 30, 2016, https://www.solereview.com/mizuno-wave-sayonara-2-review, 22 pages.

* cited by examiner

US 9,930,927 B2

FOOTWEAR INCLUDING LIGHTWEIGHT SOLE STRUCTURE PROVIDING ENHANCED COMFORT, FLEXIBILITY AND PERFORMANCE FEATURES

CROSS-REFERENCE TO RELATED APPLICATION

This application claims priority from U.S. Provisional Patent Application Ser. No. 62/169,924, entitled "Footwear Including Lightweight Sole Structure Providing Enhanced Comfort, Flexibility and Performance Features", filed Jun. 2, 2015, the disclosure of which is incorporated herein by reference in its entirety.

FIELD OF THE INVENTION

The present invention relates to an article of footwear and, in particular, footwear including a sole structure designed for flexibility combined with comfort to a user, particularly a runner.

BACKGROUND

Articles of footwear typically include an upper and a sole structure attached to the upper. For example, athletic footwear typically includes an upper secured (e.g., via adhesive and/or stitching) to a midsole that provides some level of cushioning to a user depending upon a particular use. An outsole is also typically provided to engage the surface upon which the user is walking or running, where the outsole is designed to withstand some degree of wear during use.

A variety of different sole structure configurations having varying designs and degrees of cushion, flexibility and rigidity are known, where the different configurations can be designed depending upon the terrain in which the footwear is used as well as a particular user activity (e.g., walking, running/jogging, hiking, etc.). For example, a runner typically desires a shoe that provides comfort to the user's foot while ensuring adequate cushioning and flexibility to prevent foot injuries and/or enhance user performance for a particular running activity. If the sole structure of a running shoe includes minimal cushioning structure, e.g., to reduce the weight and/or increase flexibility along portions of the shoe, user comfort might be sacrificed along with a potential increase in user injury. In contrast, a sole structure for a shoe that includes a significant amount of cushioning, while potentially minimizing user injury and enhancing user comfort during running, may negatively impact user performance due to increased weight of the shoe and/or reduced flexibility within the sole structure of the shoe.

Accordingly, it would be desirable to provide an article of footwear (e.g., for running and/or other athletic activities) including a sole structure that maintains adequate cushioning and comfort to the user while also having sufficient flexibility to enhance the natural gait cycle (heel-to-toe strike) of the user during foot movements as well as facilitating an easy heel-to-toe transition of the user's foot during the stance phase (weight-bearing phase of the gait cycle).

SUMMARY OF THE INVENTION

In example embodiments, a sole structure for an article of footwear comprises a midsole structure and an outsole structure, where the midsole structure comprises a plurality of members arranged in layers within the midsole structure. The plurality of members comprises a first cushion member comprising a first compressible material, a second cushion member comprising a second compressible material that connects with the outsole structure, and a plate disposed between the first and second cushion members, where the plate is configured to bend at one or more specific locations along a length of the plate.

In other example embodiments, a sole structure for an article of footwear comprises a midsole structure comprising an outsole structure and a plurality of members arranged in layers within the midsole structure. The plurality of members comprises a cushion member comprising a compressible material that connects with the outsole structure at a bottom side of the cushion member, and a plate secured to a top side of the cushion member that is opposed to the bottom side, where the plate is configured to bend at one or more specific locations along a length of the plate.

In further example embodiments, an article of footwear comprises an upper and a sole structure as described herein.

The above and still further features and advantages of the present invention will become apparent upon consideration of the following detailed description of specific embodiments thereof.

BRIEF DESCRIPTION OF THE DRAWINGS

Like reference numerals have been used to identify like elements throughout this disclosure.

DETAILED DESCRIPTION

Figure 1:
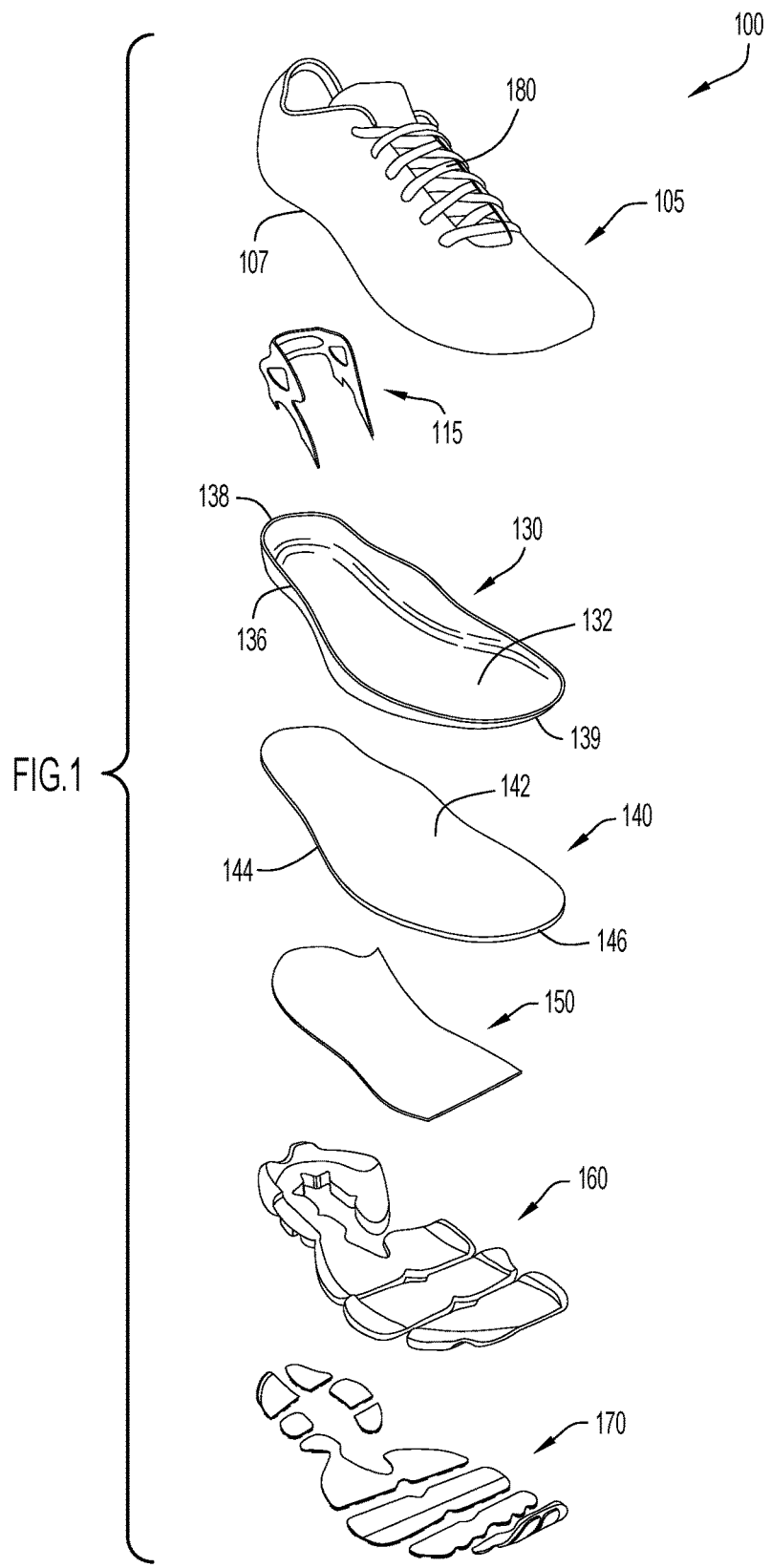
FIG. 1 is an exploded view of an article of footwear in accordance with an embodiment of the invention (footwear configured for a right foot).

As described herein with reference to the example embodiment of FIGS. 1-12, an article of footwear 100 in accordance with the invention includes an upper 105 coupled to a sole structure 110 and further including a heel counter 115 and a fastening element or fastener 180 (e.g., a lace or cord as shown in FIG. 1). The article of footwear 100, also referred to herein as a shoe, can be in the form of a running shoe or other type of athletic shoe. The sole structure 110 includes a midsole structure 120 (FIGS. 4A, 4B) and an outsole structure 170 as described herein that provide features of suitable cushioning and comfort while maintaining adequate flexibility to facilitate maintenance of a natural gait cycle by a user during use of the shoe. The midsole structure 120 includes a multi-layered structure as described herein that comprises (in order from top or foot facing side to bottom or outsole facing side) an upper midsole member 130, a strobel member 140, a flexure or midsole plate 150 (also referred to as a moderation plate) and a lower midsole member 160.

Referring to FIGS. 2A-2E, the article of footwear or shoe 100 includes a forefoot region 202 that generally aligns with the ball and toes of a user's foot (i.e., when a user is wearing the shoe), a midfoot region 204 that generally aligns with the arch and instep areas of the user's foot, and a hindfoot region 206 that generally aligns with the heel and ankle areas of the user's foot. The shoe 100 further includes a medial side 208 that is oriented along the medial or big toe side of the user's foot, a lateral side 210 that is oriented along the lateral or little toe side of the user's foot, a toe (i.e., front) end 212 that corresponds with the toe end of the user's foot and a heel (i.e., rear) end 214 that corresponds with the heel of the user's foot. The heel end 214 has a curved shape defining a heel cup that generally conforms with the user's heel and extends between the lateral and medial sides 208, 210 of the shoe 100. While many of the example embodiments depicted in the figures (including FIGS. 1 and 2A-2E) show an article of footwear (shoe) configured for a right foot, it is noted that the same or similar features can also be provided for an article of footwear (shoe) configured for a left foot (where such features of the left footed shoe are reflection or "mirror image" symmetrical in relation to the right footed shoe, e.g., the embodiment depicted in FIGS. 4A, 4B and 5).

The upper 105 defines an envelope or pocket that, when secured to a portion of the sole structure 110 as described herein, covers and protects the foot of the wearer. The upper 105 can be formed of any one or more materials suitable for its described purpose, including conventional materials (e.g., woven or nonwoven textiles, knit textiles, leather, synthetic leather, rubber, etc.). The specific materials utilized are generally selected to impart wear-resistance, flexibility, air-permeability, moisture control and/or comfort to the user wearing the shoe 100. Further, the upper 105 may possess any dimensions (size/shape) suitable for its described purpose. For example, the upper 105 may possess a "high top" configuration, in which a hindfoot region 206 of the upper extends over and/or above at least a portion of a user's ankle. Alternatively, the upper 105 may possess a "mid top" configuration (in which the upper extends to slightly below or at the user's ankle), a low top configuration, or any other suitable configuration. As described herein, the upper 105 is coupled to the sole structure 110 via the strobel member 140, where such coupling can be achieved in any conventional and/or other suitable manner (e.g., via any form of adhesion or bonding, via stitching, via one or more types of fasteners, etc.).

The shoe 100 can also include a heel counter 115 having a generally curved configuration that corresponds with the shoe heel end 214 so as to surround a portion of the upper 105 at the heel end. In an embodiment, the heel counter 115 includes a central member mounted with the sole structure 110 at a region corresponding with the hindfoot region 206 of the shoe 100 and extending distally (upward) from the sole structure 110. A pair of arms extends from the distal portion of the heel counter central member. In particular, a first arm extends from the lateral portion of the central member and along the medial shoe side 208, while a second arm extends from the distal portion of the central member and along a lateral shoe side 210. The heel counter 115 provides external strengthening at this area of the shoe 100. In particular, the heel counter 115 is configured to control and stabilize the user's heel inside the shoe to minimize excessive supination or pronation of the foot. The heel counter 115 can further be flexible, semi-rigid or rigid, and is further configured to provide rear foot stability, preventing injury and prolonging the lifespan of the shoe. The heel counter 115 can be formed of any one or more suitable materials including, without limitation, one or more thermoplastic elastomers such as EVA or TPU (thermoplastic polyurethane). The heel counter 115 can be coupled to the upper 105 in any suitable manner (e.g., via an adhesive, via welding, melt bonding, etc.).

The upper 105 can be formed in any suitable manner and utilizing any suitable number of parts or components that are combined in any suitable manner (e.g., via adhesion, molding, stitching, etc.). Further, the one or more components forming the upper can be formed in any suitable manner (e.g., via any one or combination of weaving, knitting and molding processes to form the one or more components).

As shown in FIGS. 1, 3, 4A, 4B and 5, the sole structure 110 is multi-layered, where the midsole structure 120 includes a lower midsole member 160 that is exposed (i.e., visible) along the bottom side 300 of the shoe 100 (also referred to herein as the bottom side 300 of the sole structure 110) and is directly coupled with the outsole structure 170, a midsole plate 150 that is directly coupled with (and is disposed between) the lower midsole member 160 and a strobel member 140 and is further partially exposed (i.e., visible) along the shoe bottom side 300, and the strobel member 140 is coupled along its peripheral edge portion with the upper 105 as described herein. An upper midsole member 130 is disposed adjacent to engage with the strobel member 140 and is unsecured at such engagement so as to be loose or "floating" in relation to the strobel member. For example, the upper midsole member 140 can be configured to be removably secured within the upper 105. However, in alternative embodiments, the upper midsole member 130 can be secured to one or more portions of the midsoles structure 120 and/or the upper 105.

Referring to FIGS. 1, 3 and 6-9B, the outsole structure 170 and lower midsole member 160 combine to define separate and individual sole structure elements at a ground-engaging or bottom side 300 of the sole structure 110. The bottom side 300 of the sole structure 110 includes a front or toe end 312 that corresponds with the toe end 212 the shoe 100, a rear or heel end 314 that corresponds with the heel end 214 of the shoe 100, a medial edge 308 that corresponds with the medial side 208 of the shoe 100, and a lateral edge 310 that corresponds with the lateral side 210 of the shoe 100. The individual sole structure elements, also referred to herein as pods, are isolated and separated from each other so as to facilitate a suitable degree of separate and independent flexing or bending at areas between each pod along the bottom side 300 of the sole structure 110. At least one pod can also include one or more grooves to facilitate a suitable degree of flexing or bending between two or more portions of the pod. In certain example embodiments described herein and depicted in FIGS. 1-9, the sole structure 110 includes three pods 320, 330, 340 formed by portions of the lower midsole member 160 and outsole structure 170, where each pod is isolated and separated from (i.e., not connected with) the other pods and is aligned at a particular area of the sole structure bottom side 300. However, the present invention is not limited to the particular configuration and number of pods as set forth in the example embodiments but instead can include any other suitable number of pods (e.g., one, two, three or more) having different configurations based upon a selected configuration and/or a particular purpose. Each of the pods 320, 330, 340 at least partially connects with the midsole plate 150 of the sole structure 110 in any suitable manner (e.g., via adhesion, welding, melt bonding, etc., provided between the lower midsole member 160 and the plate 150). In addition, as described herein, the midsole plate 150 is configured to bend or flex at a plurality of specific locations along its length, where the plate 150 includes indentations or flexure grooves defined at the spacing between each pair of adjacent or consecutively aligned pods (e.g., flexure grooves on the midsole plate located between the first and second pod, and between the second and third pod) and/or at flexure grooves disposed at portions of any one or more pods.

Figure 7:
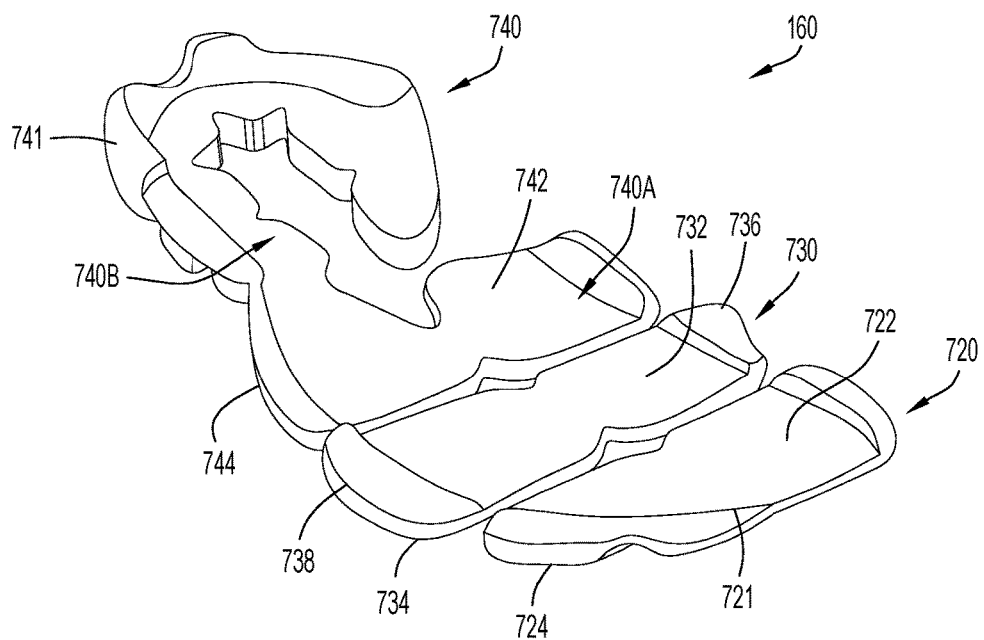
FIG. 7 is a front view in perspective of the lower midsole member forming a part of the midsole structure for the article of footwear of FIG. 1.

The first pod 320 is generally defined along a first surface area of the sole structure bottom side 300 that extends in a lengthwise direction of the bottom side 300 from the sole structure toe end 312 to a location of the bottom side 300 corresponding with the forefoot region 202 of the shoe 100 and that is at or near a location corresponding with the metatarsal-phalangeal joints of the user's foot (e.g., at the transition between phalange and metatarsal bones of the user's foot). The first pod 320 entirely covers the first surface area of the sole structure bottom side 300 so as to have a partially curved geometry including an arcuate edge corresponding with the arcuate edge of the bottom side 300 forming the toe end 312 and a generally straight edge defining the rearward end of the first pod 320. The first pod 320 comprises a plurality of outsole structure elements 620A, 620B (FIG. 6) of the outsole structure 170 secured with a lower midsole structure element 720 of the lower midsole member 160 (FIG. 7). An upper (i.e., foot facing) side 622 of each of the outsole structure elements 620A, 620B is secured to a portion of a lower (i.e., outsole facing) side 724 of the lower midsole structure element 720 in any suitable manner (e.g., via adhesion, welding, melt bonding, etc.), where the lower side 724 can optionally include one or more indentations along its surface to receive a portion of the outsole structure elements. Similarly, an upper (i.e., foot facing) side 722 of midsole structure element 720 is secured to a portion of a lower (i.e., outsole facing) side 824 of the midsole plate 150 and also a portion of a lower (outsole facing) side 144 of the strobel 140. As can be seen, e.g., in FIGS. 9A and 9B (depicting the midsole plate 150 and lower midsole member 160), a portion of the plate 150 including its front (i.e., toe facing) end 812 extends slightly over the rearward end of and onto the first pod 320, and this portion of the plate 150 is secured to the midsole structure element 720 while the remaining portion of the midsole structure element 720 extending forwardly from the midsole plate front end 812 is secured to the strobel 140.

The first pod 320 includes an indentation or groove 325 formed along the lower side 722 of the lower midsole structure element 720 and that extends in a direction transverse a lengthwise dimension (i.e., between medial edge 308 and lateral edge 310) of the bottom side 300 of the sole structure 110. The groove 325 is further located between and defines the separation between the outsole structure elements 620A, 620B, where the groove 325 can further be configured, in combination with the midsole plate 150, to permit a certain degree of bending or flexure of the lower midsole structure element 720 at the groove 325 during use of the shoe 100. Thus, the first pod 320 defines first and second pod elements as outsole structure elements 620A, 620B which can be configured to have a slight degree of independent movement in relation to each other due to some degree of bending or flexing at the groove 325 located between these pod elements. The groove 325 has a generally linear configuration and includes, at a generally central portion of the groove 325, a widened section 326 that corresponds with V-shaped indentations formed along facing edges of the outsole structure elements 620A, 620B (e.g., the widened section 326 can have a generally circular or diamond shaped configuration). The outsole structure elements 620A, 620B substantially cover the area defined by the lower side 722 of the lower midsole structure element 720 that does not include the groove 325.

Figure 2A:
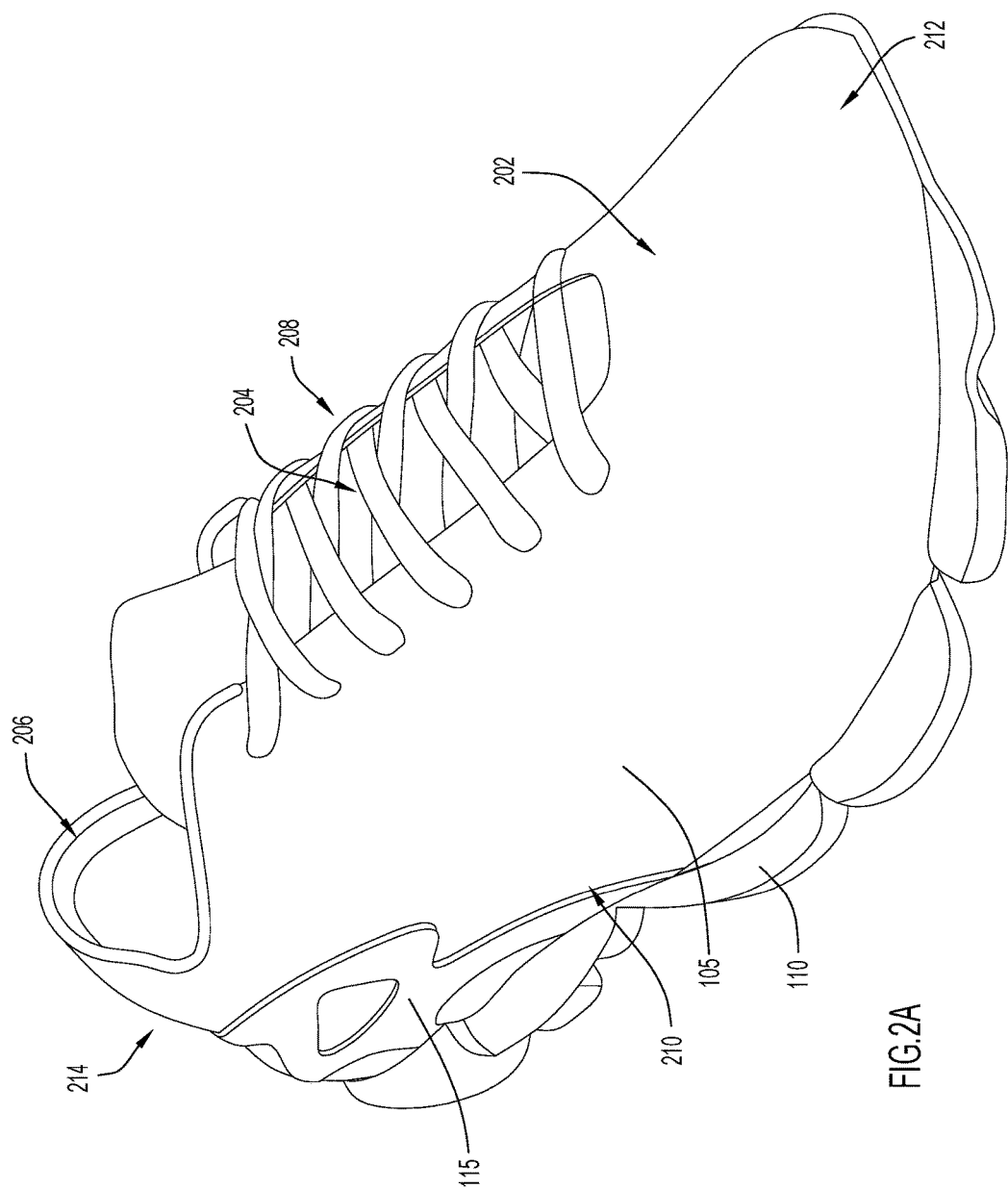
FIG. 2A is side view in perspective of the article of footwear shown in FIG. 1, showing the lateral footwear side.
Figure 2B:
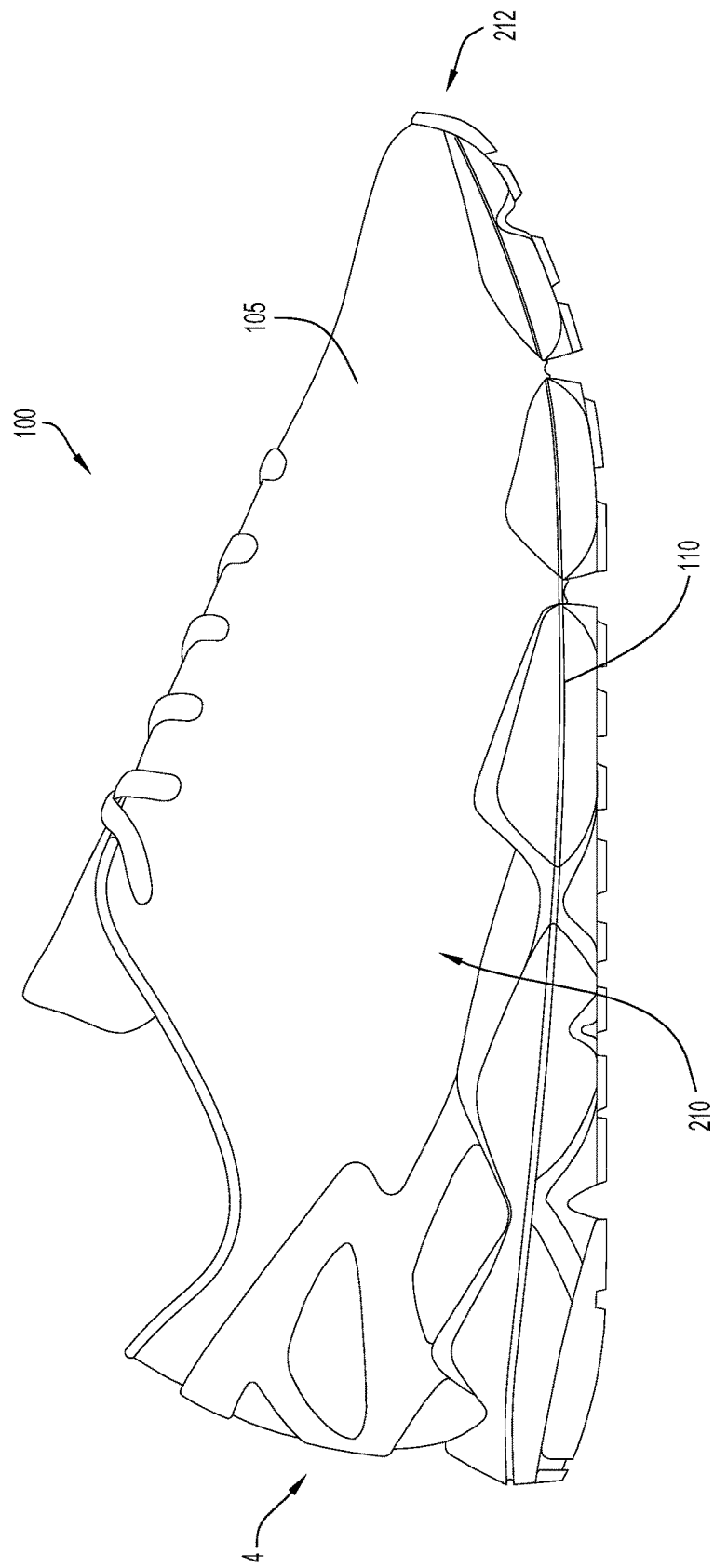
FIG. 2B is a side view in elevation of the article of footwear shown in FIG. 1, showing the lateral footwear side.
Figure 2C:
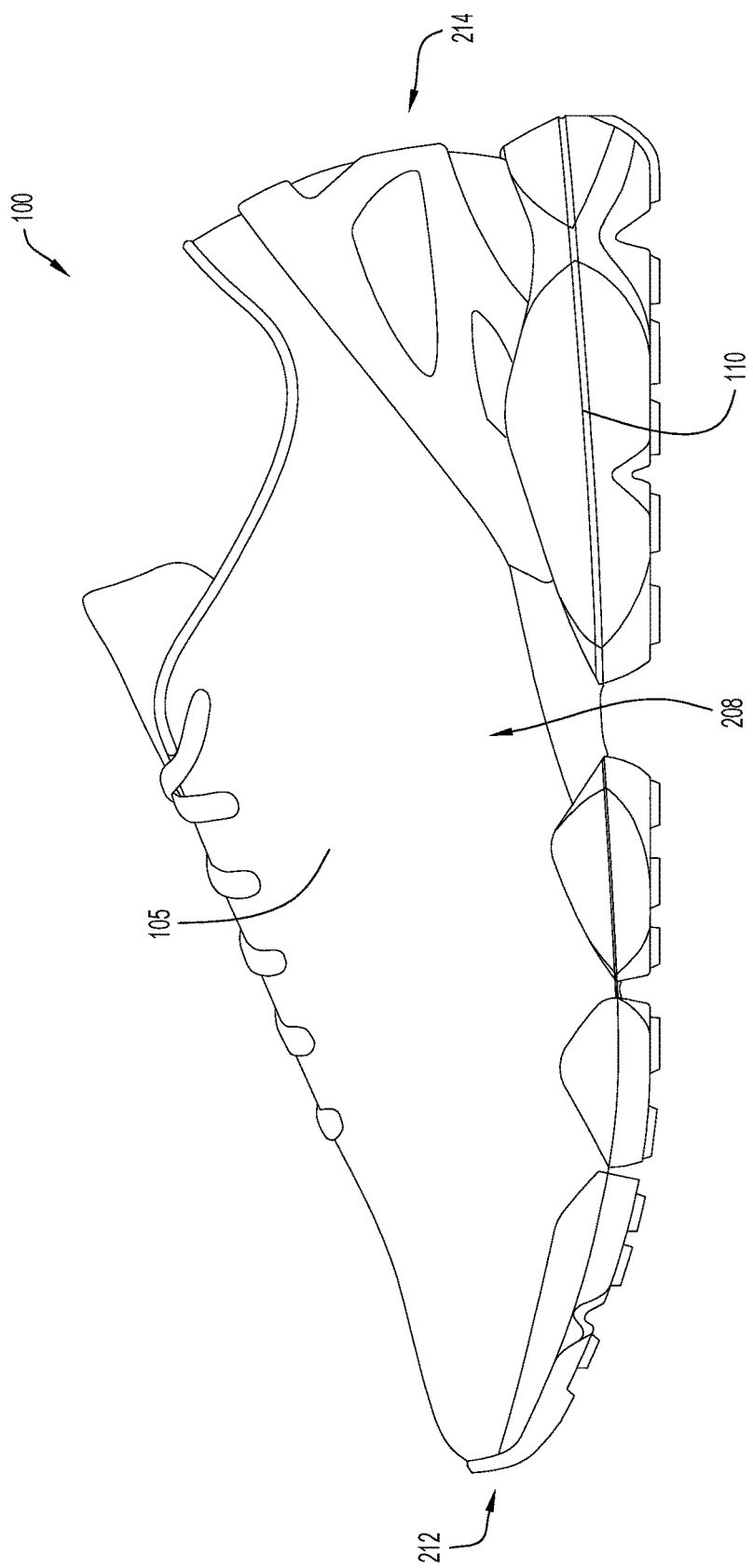
FIG. 2C is a side view in elevation of the article of footwear shown in FIG. 1, showing the medial footwear side.
Figure 2D:
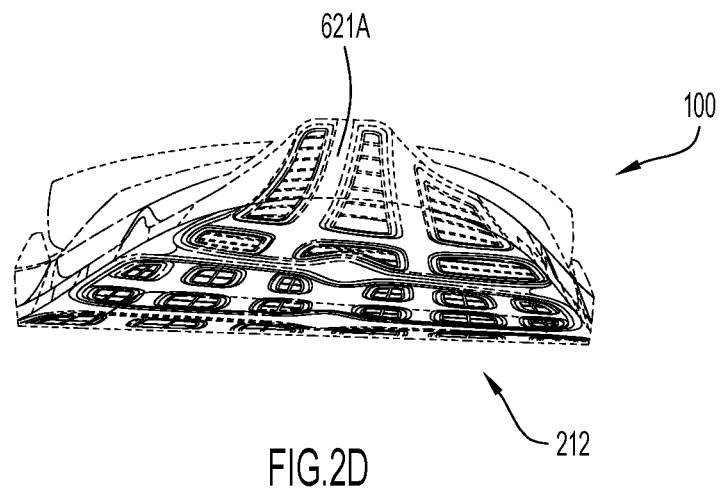
FIG. 2D is a front view in elevation of the article of footwear shown in FIG. 1.
Figure 2E:
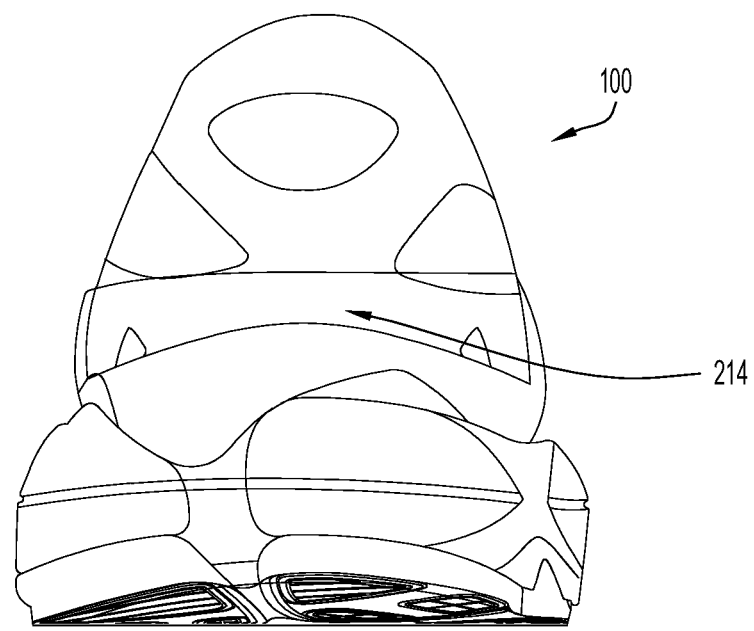
FIG. 2E is a rear view in elevation of the article of footwear shown in FIG. 1.

The outsole structure element 620A, which is disposed forward of outsole structure element 620B at the bottom side toe end 312, includes a forward end 621A that extends slightly beyond the bottom surface 300 and curves upward along the front peripheral edge of the shoe toe end 212 and slightly around the medial and lateral sides 208, 210 of the shoe 100 (see, e.g., FIG. 2D). The lower midsole structure element 720 includes a peripherally located curved sidewall 721 that extends slightly upward from the upper side 722 along locations corresponding with the exterior sidewall periphery of shoe 100 so as to slightly overlap and/or connect (e.g., via adhesion, welding, melt bonding, etc.) with corresponding lower sidewall portions of the upper 105. Thus, a transverse cross-section of the lower midsole structure element 720 has a curved and arcuate profile due to the upwardly extending peripheral sidewall 721.

The second pod 330 is secured at the bottom side 300 of the sole structure 110 and spaced a slight distance from the first pod 320 such that a portion of the midsole plate lower side 824 is exposed and visible at the bottom side 300 between the first and second pods 320, 330. The second pod 330 has a generally rectangular configuration and is generally defined along a second surface area of the sole structure bottom side 300 that extends in a lengthwise direction of the sole structure bottom side 300 from a portion of the forefoot region 202 that is at or near the metatarsal-phalangeal joints of the user's foot to a portion at or near the midfoot region 204 of the shoe 100. The second pod 330 entirely covers the second surface area of the sole structure bottom side 300 and comprises an outsole structure element 630 connected to a lower midsole structure element 730, where an upper (i.e., foot facing) side 632 of the outsole structure element 630 is secured to the lower (i.e., outsole facing) side 734 of the lower midsole structure element 730 via any suitable securing structure (e.g., adhesion, welding, melt bonding, etc.), where the lower side 724 can optionally include one or more indentations along its surface to receive a portion of the outsole structure elements. Similarly, an upper (i.e., foot facing) side 732 of midsole structure element 730 is secured to a corresponding portion of the lower side 824 of the midsole plate 150 via any suitable securing structure (e.g., adhesion, welding, melt bonding, etc.). The outsole structure element 630 substantially covers the area defined by the lower side 734 of the lower midsole structure element 730. The second surface area of the sole structure bottom side 300, entirely covered by the second pod 330, is smaller in relation to the first surface area entirely covered by the first pod 320. The lower midsole structure element 730 includes medial and lateral side walls 736, 738 (i.e., which correspond with the medial and lateral edges 308, 310 of the bottom side 300) that extend slightly upward from the upper side 732 so as to slightly overlap and/or connect (e.g., via adhesion, welding, melt bonding, etc.) with corresponding lower sidewall portions of the upper 105.

An indentation or flexure groove 335 is defined along the midsole plate lower side 822 that extends in a direction transverse the lengthwise dimension of the sole structure bottom side 300 and corresponds with the spacing between the first pod 320 and second pod 330 (i.e., the location at which the midsole plate 150 is exposed at the bottom side 300 between the first and second pods). The flexure groove 335 has a generally linear configuration and includes, at a generally central portion of the groove 335, a widened section 336 that corresponds with corresponding V-shaped indentations formed along facing edges of the outsole structure elements 620B, 630 and the lower midsole structure elements 720, 730. The flexure groove 335 facilitates a suitable degree of bending or flexure of the midsole plate 150 at the flexure groove 335 during use of the shoe 100, thus permitting a degree of separate and independent movement between pods 320, 330.

The third pod 340 is secured at the bottom side 300 of the sole structure 110 and is spaced a slight distance from the second pod 330 such that a portion of the midsole plate lower side 822 is exposed and visible between the second and third pods. The third pod 340 is generally defined along a third surface area of the sole structure bottom side 300 that extends in a lengthwise direction of the sole structure bottom side 300 from a portion of the midfoot region 204 to the hindfoot region 206 of the shoe 100 and bottom side heel end 314. The third surface area is significantly greater than each of the first and second surface areas covered by the first and second pods 320, 330. However, unlike the first and second pods 320, 330, the third pod 340 does not entirely cover the third surface area of the sole structure bottom side 300. Instead, the third pod 340 includes a portion that extends in an elongated and curved manner along the lengthwise dimension of the sole structure bottom surface 300, generally defining a "C" shaped pattern in which portions of the third area are not covered such that the lower side 824 of the midsole plate 150 is exposed at such uncovered portions.

The third pod 340 comprises a lower midsole structure element 740 including a generally rectangular first portion 740A defined at a forward section of the third area and that extends across the forward section transverse the lengthwise dimension of the sole structure bottom side 300 and between its medial and lateral edges 308, 310. The lower midsole structure element 740 further includes a second portion 740B that is elongated, extending in a curved manner from the first portion 740A and in a rearward direction along the third area, where the elongated second portion 740B extends from the first portion 740A and adjacent a portion of the bottom side lateral edge 310 (which corresponds with the shoe lateral side 210). The elongated second portion 740A further curves around a portion of the bottom side 300 proximate or adjacent the bottom side heel end 314 (which corresponds with the shoe heel end 214) and continues extending slightly in a forward direction along the third area and adjacent a portion of the bottom side medial edge 308 (which corresponds with the shoe medial side 208), terminating at a location proximate but slightly spaced from the first portion 740A. Thus, the midsole plate lower side 822 is exposed along the sole structure bottom side 300 at a central area portion 823 of the third area between the lower midsole structure element first and second portions 740A, 740B. In other words, pod 340 continuously extends along the bottom side of the sole structure adjacent a portion of a lateral side, a heel side and a portion of a medial side of the sole structure while defining a central location between the lateral side portion and medial side portion that exposes a portion of the plate at the bottom side of the sole structure. The central area portion 823 of the midsole plate 150 generally corresponds with the arch of the user's foot at a forward portion of the hindfoot region 206 and/or a rear portion of the midfoot region 204 of the shoe 100. The lower midsole structure element 740 includes a curved sidewall 741 that extends slightly upward and at the periphery of the lower midsole structure element 740 so as to slightly overlap and/or connect (e.g., via adhesion, welding, melt bonding, etc.) with corresponding peripheral sidewall portions of the upper 105.

A plurality of outsole structure elements 640A-640F are spaced from each other and connect with the lower midsole structure element 740, where the upper (i.e., foot facing) side 642 of each of the outsole structure elements 640 is secured to the lower (i.e., outsole facing) side 744 of the lower midsole structure element 740 via any suitable securing structure (e.g., adhesion, welding, melt bonding, etc.), where the lower side 724 can optionally include one or more indentations along its surface to receive a portion of the outsole structure elements. Similarly, an upper (i.e., foot facing) side 742 of the midsole structure element 740 is secured to a corresponding portion of the lower (i.e., outsole facing) side 824 of the midsole plate 150.

In particular, a first outsole structure element 640A is secured to the lower midsole structure element 740 and includes a portion extending across the sole structure bottom side 300 between its bottom side medial and lateral edges 308, 310 and also rearwardly along a portion of the bottom side lateral edge 310 so as to correspond with and entirely cover the first portion 740A and part of the second portion 740B. A second generally rectangular outsole structure element 640B is spaced and extends rearwardly from the first outsole structure element 640A and further is secured upon a part of the second portion 740B along a portion of the bottom side lateral edge 310. A generally linear indentation or groove 355A is defined along the midsole structure lower side 742 extending in a direction transverse the lengthwise dimension of the sole structure bottom surface 300 and that corresponds with the spacing between the first and second outsole structure elements 640A, 640B. The groove 355A can be configured to facilitate a certain degree of bending or flexure of the lower midsole structure element 740 between the first and second outsole structure elements 640A, 640B at the groove 335A during use of the shoe 100, which in turn permits a certain degree of separate and independent movement between the first and second outsole structure elements 640A, 640B during use of the shoe 100.

A third outsole structure element 640C is secured upon a part of the second portion 740B and is spaced and extends rearwardly from the second outsole structure element 640B along the bottom side lateral edge 310 and to the bottom side heel end 314. A generally linear indentation or groove 355B is defined along the midsole structure lower side 742 extending in a direction transverse the lengthwise dimension of the sole structure bottom surface 300 and that corresponds with the spacing between the second and third outsole structure elements 640B, 640C, where the groove 355B can be configured to permit a certain degree of bending or flexure of the lower midsole structure element 740 at the groove 355B so as to permit a corresponding degree of separate and independent movement between the second and third outsole structure elements 640B, 640C during use of the shoe 100.

A fourth outsole structure element 640D is secured upon a part of the second portion 740B and is spaced and extends from the third outsole structure element 640C in a transverse direction and along the bottom side heel end 314 toward the medial side edge 308 of the sole structure bottom surface 300. A generally linear indentation or groove 355C is defined along the midsole structure lower side 742 at the spacing between the third and fourth structure elements 640C, 640D, where the groove 355C further extends in a direction that generally corresponds with the lengthwise dimension of the bottom surface 300. The groove 355C can be configured to permit a certain degree of bending or flexure of the lower midsole structure element 740 at the groove 355C to permit a corresponding degree of separate and independent movement between the third and fourth outsole structure elements 640C, 640D during use of the shoe 100.

A fifth outsole structure element 640E is secured upon a part of the second portion 740B and is spaced and extends forwardly from the fourth outsole structure element 640D along the medial side edge 308 of the bottom surface 300. A generally linear groove 355D is defined along the midsole structure lower side 742 at the spacing between the fourth and fifth outsole structure elements 640D, 640E, where the groove 355D extends in a direction transverse the lengthwise dimension of the sole structure bottom surface 300. The groove 355D can be configured to permit a certain degree of bending or flexure of the lower midsole structure element 740 at the groove 355D to permit a corresponding degree of separate and independent movement between the fourth and fifth outsole structure elements 640D, 640E during use of the shoe 100.

A sixth outsole structure element 640F is secured upon a remaining part of the second portion 740B and is further spaced and extends forwardly from the fifth outsole structure element 640E along the medial side edge 308 of the bottom surface 300. A generally linear groove 355E is defined along the midsole structure lower side 742 at the spacing between the fifth and sixth outsole structure elements 640E, 640F. The groove 355E extends in a direction transverse the lengthwise dimension of the sole structure bottom surface 300 and can be configured to permit a certain degree of bending or flexure of the lower midsole structure element 740 at the groove 355E to permit a corresponding degree of separate and independent movement between the fifth and sixth outsole structure elements 640E, 640F during use of the shoe 100.

Figure 3:
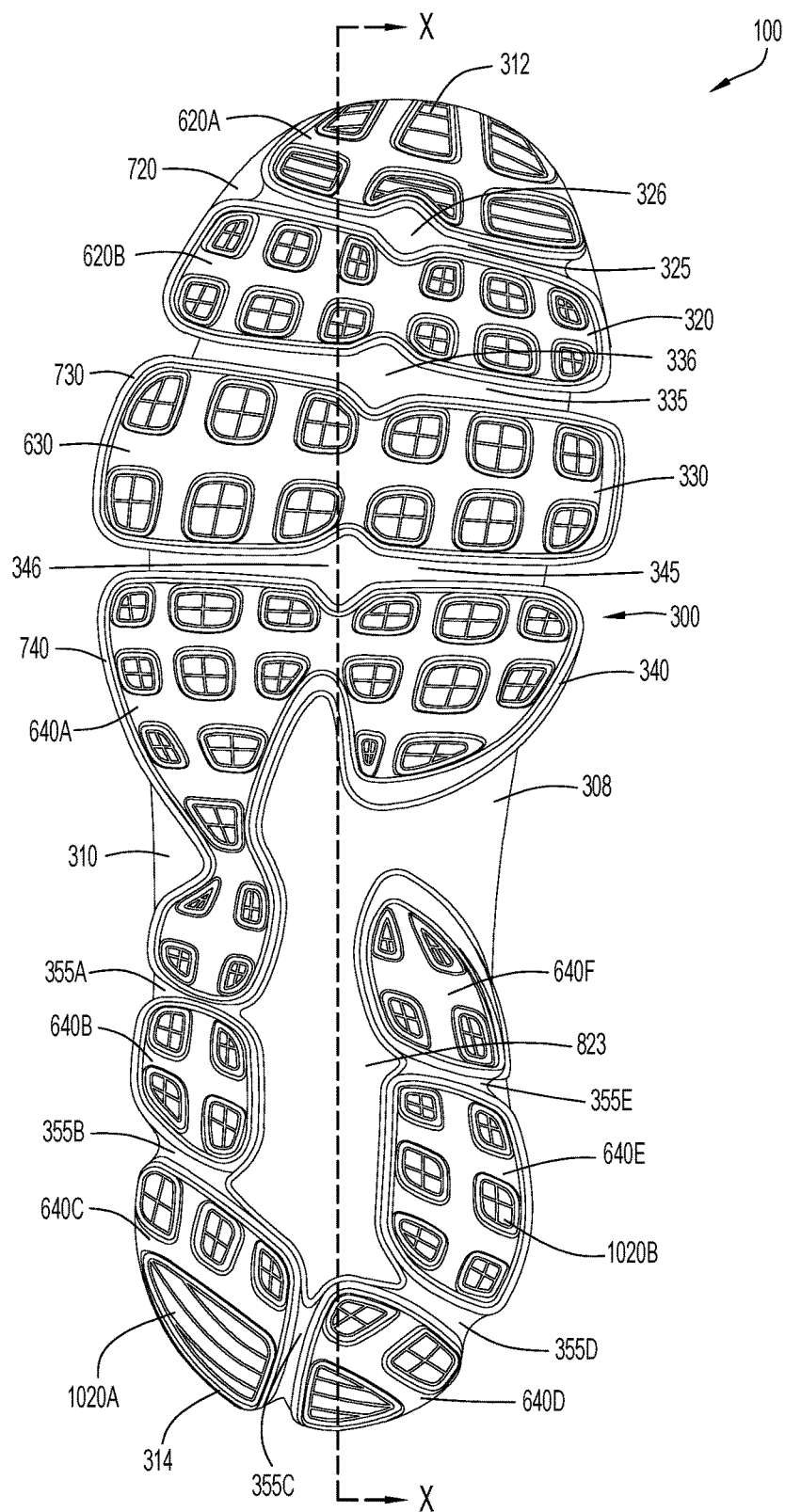
FIG. 3 is a bottom view in plan of the article of footwear shown in FIG. 1.
Figure 4A:
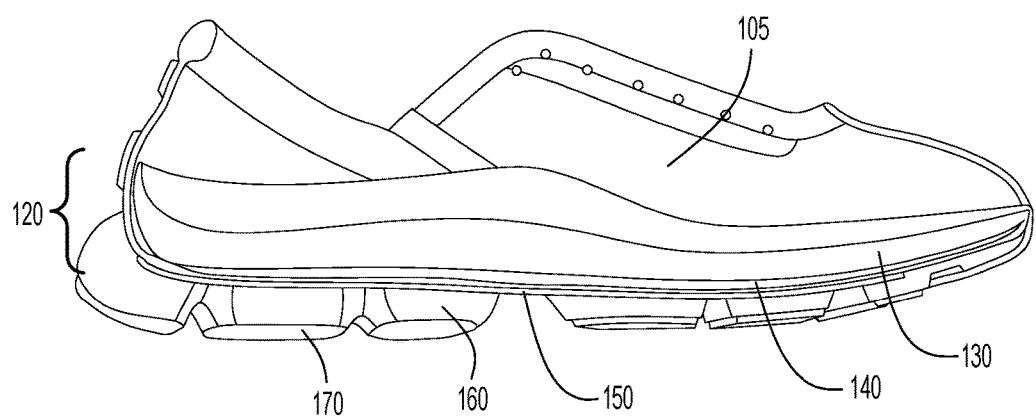
FIG. 4A is a cross-sectional side view in elevation of an article of footwear (footwear configured for a left foot) corresponding with the article of footwear shown in FIG. 1, in which the cross-section is taken along a central line extending the lengthwise dimension of the article of footwear (i.e., between the shoe toe end and heel end) as represented by line X-X of FIG. 3.
Figure 4B:
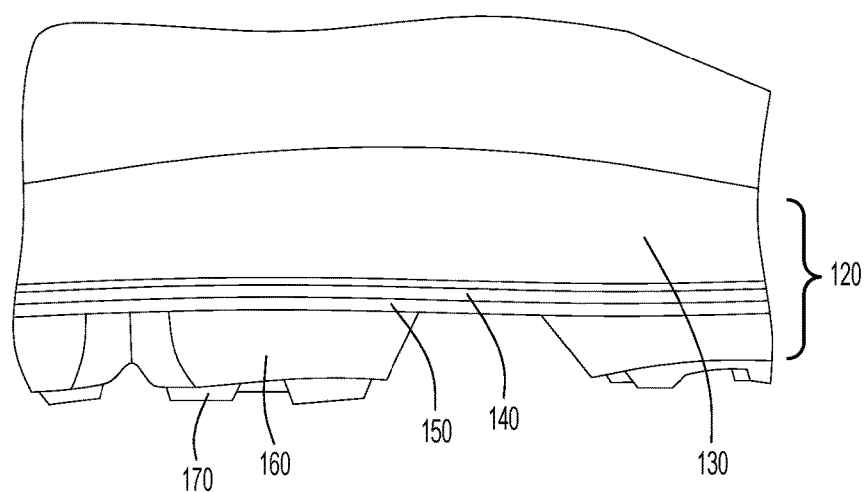
FIG. 4B is a partial magnified view of the cross-sectional side view in elevation of the article of footwear of FIG. 4A, showing layered portions of the sole structure.
Figure 11:
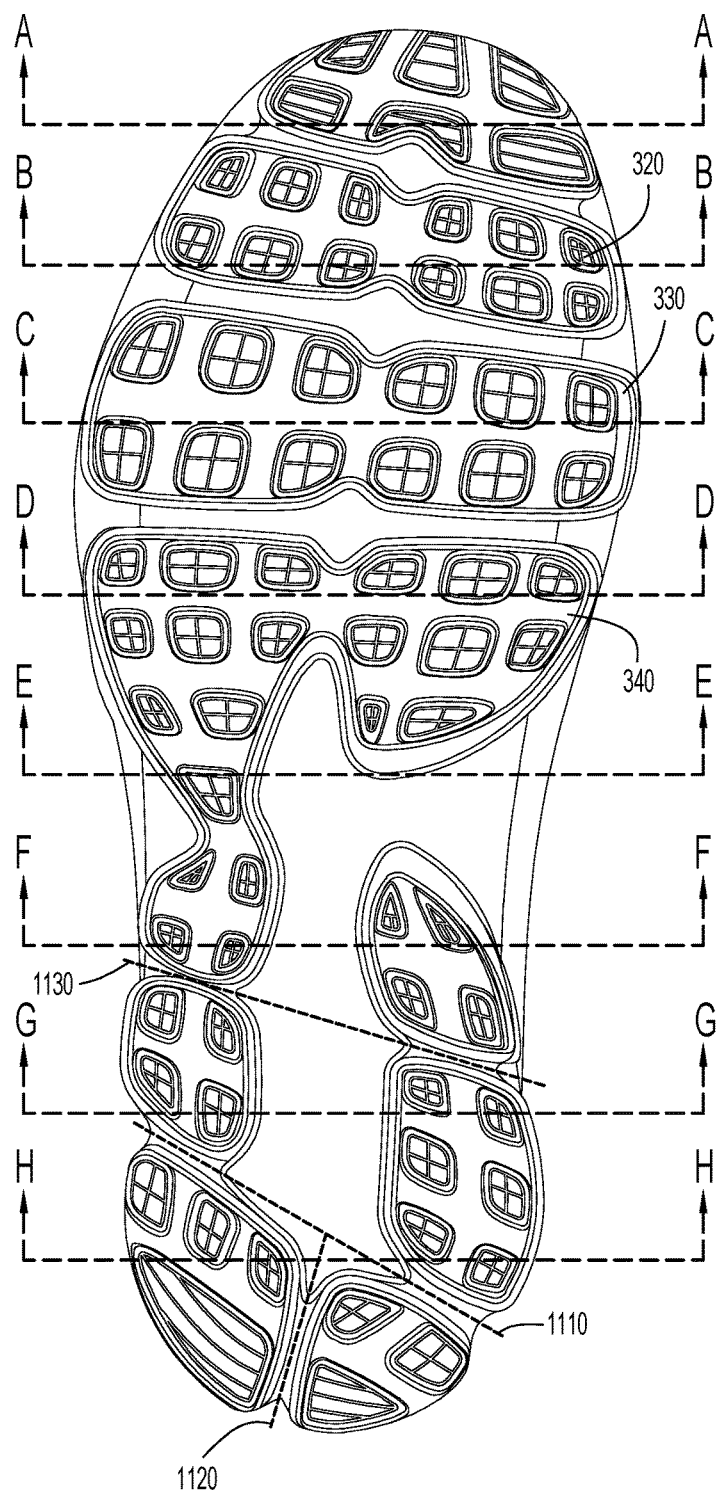
FIG. 11 is a bottom view in plan of the article of footwear of FIG. 1, including various sectional lines for the cross-sectional views of FIGS. 12A-12H.
Figure 12:
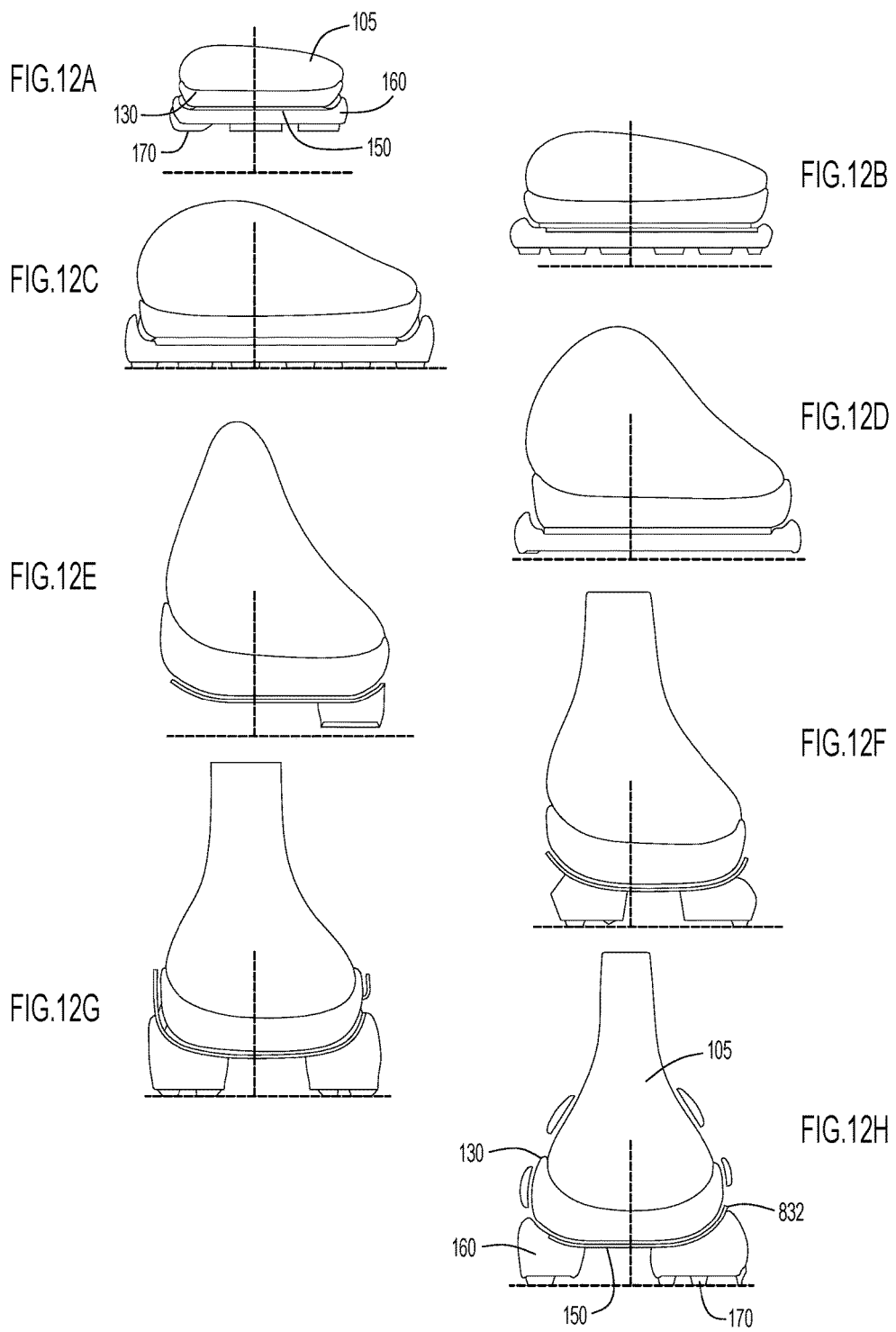
FIGS. 12A-12H are cross-sectional views of the article of footwear of FIG. 11, taken along the various sectional lines A-H as shown in FIG. 11, where each cross-sectional line extends in a direction transverse the lengthwise dimension of the article of footwear.

As shown in FIG. 3 (and also in FIG. 11), the groove 355B (located between the second and third outsole structure elements 640B, 640C and at or adjacent the lateral side of the sole structure/shoe) and the groove 355D (located between the fourth and fifth outsole structure elements 640D, 640E and at or adjacent the medial side of the sole structure/shoe) are aligned so as to be separated from but substantially collinear with each other along the bottom side 300 (e.g., aligned along the same line 1110 as depicted in FIG. 11). Similarly, the groove 355A (located between the first and second outsole structure elements 640A, 640B and at or adjacent the lateral side of the sole structure/shoe) and the groove 355E (located between the fifth and sixth outsole structure elements 640E, 640F and at or adjacent the medial side of the sole structure/shoe) are also aligned so as to be separated from but substantially collinear with each other along the bottom side 300 (e.g., aligned along the same line 1130 as depicted in FIG. 11). As described herein, the design of the sole structure 110 and combination of grooves 355B, 355D aligned collinearly with each other results in a hinge-like flexure line (i.e., along line 1110) of the pod 340 at a location proximate the bottom side heel end 314. Similarly, the design of the sole structure 110 and combination of collinear-aligned grooves 355A, 355E can result in a hinge-like flexure line (i.e., along line 1130) for the pod 330 at a location forward the bottom side heel end 314.

An indentation or flexure groove 345 is further defined along the midsole plate lower side 822 that extends in a direction transverse the lengthwise dimension of the sole structure bottom side 300 and corresponds with the spacing between the second pod 330 and third pod 340. The flexure groove 345 has a generally linear configuration and includes, at a generally central portion of the groove 345, a widened section 346 that corresponds with corresponding V-shaped indentations formed along facing edges of the outsole structure elements 630, 640A and the lower midsole structure elements 730, 740. The flexure groove 345 facilitates a suitable degree of bending or flexure of the midsole plate 150 at the flexure groove 345 during use of the shoe 100, thus permitting a degree of separate and independent movement between the second and third pods 330, 340.

The lower midsole member 160 and outsole structure 170 can have suitable thicknesses and be constructed of suitably compressible materials so as to provide sufficient cushioning comfort and flexibility based upon a particular purpose. In example embodiments, the lower midsole member 160 is formed of a compressible material having a greater cushioning or degree of compressibility and also a greater thickness in relation to the compressible material forming the outsole structure 170. For example, in one embodiment, the lower midsole member 160 can be formed of a compressible material having a Shore A durometer of about 40-65 (e.g., about 40-50), such as an ethylene vinyl acetate (EVA) foam material having a Shore A durometer within such range. In another embodiment, the compressible material may be foam including ethylene vinyl acetate blended with one or more of an EVA modifier, a polyolefin block copolymer, and a triblock copolymer, also having a Shore A durometer of about 40-65 (e.g., about 45 Shore A). In example embodiments, the thickness of the lower midsole member 160 can vary along the lengthwise dimension of the shoe 100. The lower midsole member 160 can vary in thickness dimensions at different lengthwise locations of the sole structure, with thickness dimensions that are similar to those of the upper midsole member 130.

The outsole structure 170 is harder and less compressible in relation to the lower midsole member 160, e.g., having a Shore A durometer greater than 50. For example, the outsole structure 170 can be formed of a suitable compressible material (e.g., rubber) having a Shore A durometer of approximately 60-80 (e.g., a Shore A durometer of about 65-70). The thickness of the outsole structure 170 is further smaller in relation to the lower midsole member. For example, the outsole structure 170 can have an overall or maximum thickness of no greater than about 4.0 mm, in particular an overall or thickness of no greater than about 3.0 mm. The outsole structure can be formed with a plurality of layers including at least one textile or fabric layer disposed between two rubber layers, where the thickness of the plurality of layers (excluding any ground engaging elements or lugs extending from a lowermost rubber layer of the plurality of layers) can have a thickness of no greater than about 2.0 mm or even about 1.5 mm, and further still no greater than about 1.2 mm.

Referring to FIG. 3, the outsole structure 170 includes a base structure 1010 and a plurality of ground engaging/traction elements or lugs 1020 extending from the base structure 1010 at the lower sides 624, 634, 644 for each of the outsole structure elements 620, 630, 640 forming the outsole structure. The lugs 1020 can have any suitable sizes and geometric configurations (e.g., generally rectangular, diamond shaped and/or triangular configurations as depicted in the figures and/or any other geometric configurations) and can be spaced in any suitable patterns and alignments along the lower sides 624, 634, 644 for each of the pods 320, 330, 340. As depicted in the example embodiments of the figures, the lugs 1020 extend in generally linear rows oriented along the pods 320 in a direction transverse the lengthwise dimension of the bottom side 300, where each pod 320, 330, 340 includes a plurality or rows of lugs 1020. For example, each of outsole structure elements 620A, 620B and 630 of pods 320, 330 can include two rows of lugs 1020, where each row includes six lugs 1020 spaced apart from each other along the row. The pod 340 can include further (i.e., more than two) rows of lugs 1020 spaced along outsole structure elements 640A-640F, with six or less lugs 1020 provided within each row and spaced from each other.

In the example embodiments depicted in FIGS. 1-11, the lugs 1020 comprise a first set of lugs 1020A disposed on outsole structure elements 620A, 640C, 640D at surface portions of the bottom surface 300 at or near the toe end 312 and heel end 314. The first set of lugs 1020A include etches or grooves formed on ground engaging surfaces of the lugs 1020A, where the grooves extend generally in parallel with each other and in a direction that is transverse the lengthwise dimension of the bottom side 300. The lugs 1020 further comprise a second set of lugs 1020B disposed on outsole structure elements 620B, 630 and 640 at surface portions of the bottom side 300 located between the locations of lugs 1020A at the toe and heel ends 312, 314. The second set of lugs 1020B include etches or grooves formed on ground engaging surfaces of the lugs 1020B, where each lug 1020B includes a first groove extending in a direction that is in general correspondence with the lengthwise dimension of the bottom side 300 and a second groove extending in a direction transverse so as to intersect with the first groove so as to form a cross-shaped ("+") groove pattern. In other embodiments, the lugs can have any other one or more types of configurations, shapes and/or patterns designed for a particular purpose or end use of the shoe.

The base structure 1010 for the outsole structure 170 can include any one or more layers of rubber and/or any other types of materials. In the example embodiment depicted in FIG. 10, the base structure 1010 includes a first or lower layer 1012 to which the lugs 1020 are connected, a second or intermediate layer 1014 connected with the first layer 1012, and a third or upper layer 1016 that defines an upper side 624, 634, 644 for a respective outsole structure element 620, 630, 640. The base structure 1010 (which includes the first, second and third layers) can have a thickness that is less than the thickness of the lugs 1020. For example, the base structure 1010 can have an overall thickness of no greater than about 1.2 mm, while the lugs 1020 can have a thickness as great as about 2.0 mm. Any one or more of the layers and/or lugs can be constructed of a suitable rubber material, such as a rubber material formed from elastomers, siloxanes, natural rubber, and/or synthetic rubber.

Figure 10:
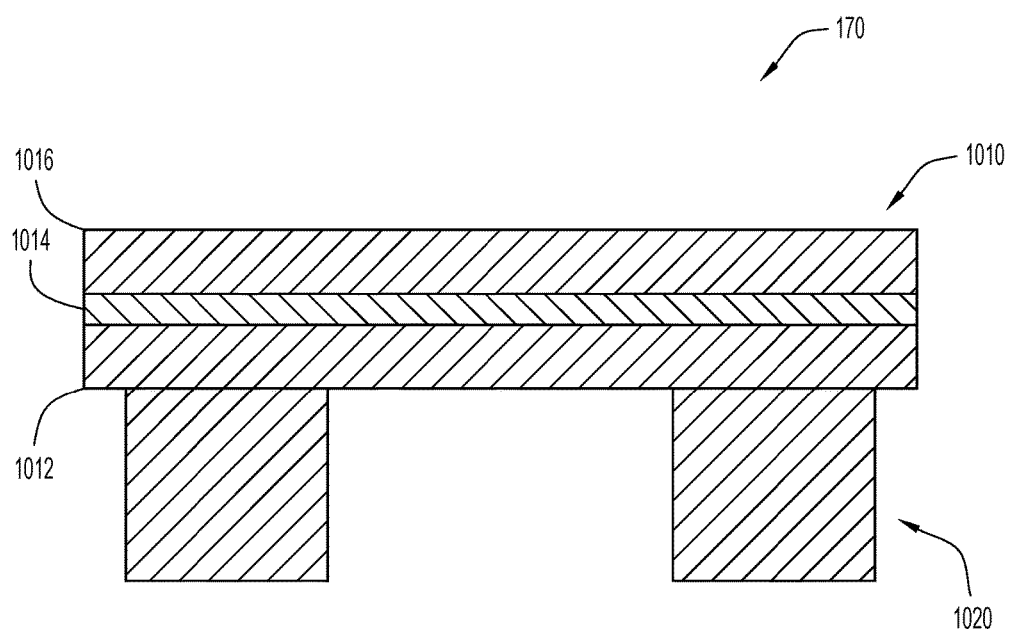
FIG. 10 is a cross-sectional side view in elevation of a portion of the outsole structure for the article of footwear of FIG. 1.

In the example embodiment of FIG. 10, the first and third layers 1012, 1016 as well as the lugs 1020 are formed of a suitable rubber material, while the intermediate layer 1014 is formed of a different material such as a fabric or other suitably lightweight material. For example, layer 1014 can be formed from any suitable textile or fabric (e.g., fabric mesh) material including any one or combination of compounds selected from the group consisting of polyurethanes, polyesters (e.g., polyethylene terephthalate), polyolefins (e.g., polyethylene and polypropylene), polyamides (e.g., aliphatic or aromatic polyamide materials, such as nylon), elastomers, carbon fibers, and any suitable combinations or copolymers thereof. The textile or fabric can further be formed via and suitable types of natural and/or synthetic fibers, filaments or yarns that can be formed via any suitable method(s) (e.g., woven, nonwoven, knitted, etc.). The textile second layer can be configured to provide a reinforcement or scrim layer within the outsole structure to enable the formation of a suitably thick outsole structure having sufficient strength and while also a reduced weight. The first and third layers 1012, 1016 can also have a greater thickness than the second or intermediate layer 1014 of the base structure 1010. This allows the outsole structure 170 to have a configuration that is lighter (i.e., more lightweight) and having a decreased thickness in relation to other (e.g., conventional) outsole structures provided for other shoes.

Referring to FIGS. 8A-9B, the midsole plate 150 includes a lower (i.e., outsole facing) side 824 that secures to the lower midsole member 160 and an upper (i.e., foot facing) side 822 that secures (e.g., via adhesion, welding, heat bonding, etc.) to a lower side 144 of the strobel member 140. The midsole plate 150 has a shape or configuration that generally corresponds with the shape of the lower midsole member 160 with the exception that the midsole plate 150 is truncated so as to form a generally linear edge at its front end 812. For example, the midsole plate 150 includes a rear end 814 including a rounded edge that aligns with the bottom side heel end 314. The midsole plate 150 extends from its rear end 814 along the lower midsole member 160 to its front end 812, which terminates at the first pod 320 slightly forward in relation to the flexure groove 335. Thus, the midsole plate 150 does not extend the full length of the bottom side 300 of the sole structure 110, where a gap 905 is defined along a portion of the lower midsole section upper side 724 of the first pod 320 between the midsole plate front end 812 and the front end 212 of the shoe 100.

The midsole plate 150 is very thin, having a thickness that can be constant or vary along its length and/or width dimensions. In example embodiments, the midsole plate 150 has a thickness in the range from about 1-2 mm (e.g., about 1.0-1.5 mm, such as about 1.2 mm). The plate 150 has some generally planar portions that transition to some non-planar (e.g., rounded) portions along the plate. In particular, located at the rear end 814 of the midsole plate 150 is a relatively flat or planar portion corresponding with grooves 355B, 355C and 355D along the lower side 724 of the lower midsole section 740. This planar portion of the plate 150 transitions to upward curving peripheral sidewall edge portions located slightly forward the plate rear end 814 and corresponding with the shoe hindfoot region 206 and the ankle of the user's foot. The peripheral sidewall edge portions of the plate 150 curve upwardly (i.e., toward the upper 105) along both the medial side 808 and lateral side 810 of the plate 150, forming an apex or peak 830 on the plate medial side 808 and a similar apex or peak 832 on the plate lateral side 810 resembling wings of the plate 150 at such locations. The peripheral sidewall edge portions of the plate 150 curve downward (i.e., toward the lower midsole member 160) in a direction extending forward from the peaks 830, 832 toward the front end 812. The peripheral edges of the plate 150 become flat at a forward location of the midfoot region 204 corresponding with the arch of the user's foot. Thus, the plate 150 has an upwardly curving, arcuate profile taken at a cross-section transverse the length of the plate (i.e., in a direction extending between the medial and lateral sides 808, 810) at portions of the shoe hindfoot region 206 and at which the peaks 830, 832 are located, and the plate transitions at a location forward of the peaks 830, 832 (i.e., within the midfoot region 204 and at the forefoot region 202 of the shoe 100) to a substantially flat profile in the transverse cross-section of the plate. This is also shown in the various cross-sectional views of FIGS. 12A-12H as described herein.

Figure 8A:
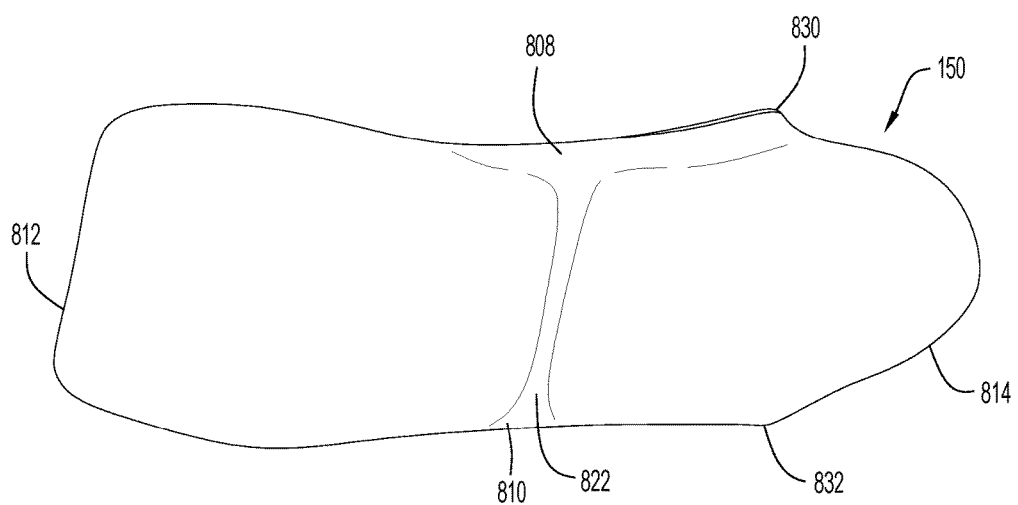
FIG. 8A is a view in plan of the upper side of the midsole plate forming part of the midsole structure for the article of footwear of FIG. 1.
Figure 8B:
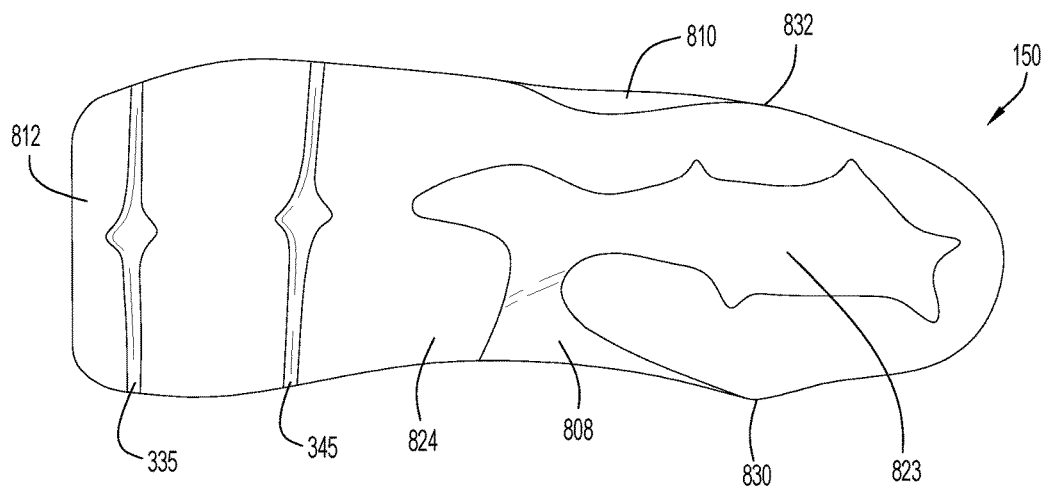
FIG. 8B is a view in plan of the lower side of the midsole plate forming part of the midsole structure for the article of footwear of FIG. 1.
Figure 9A:
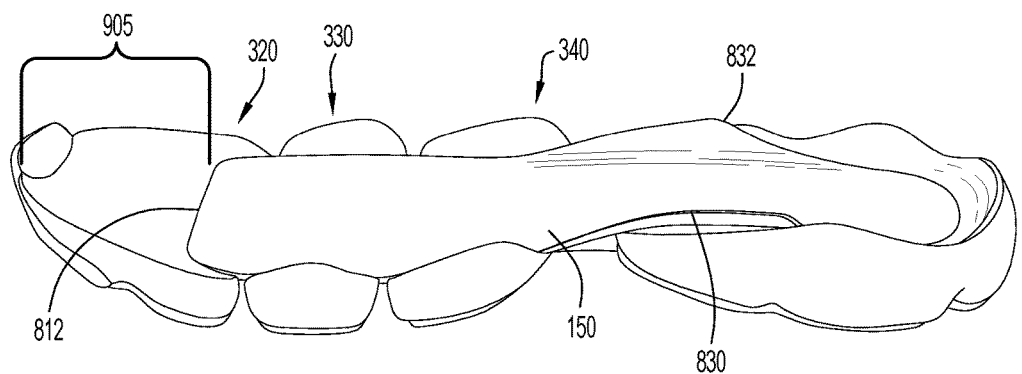
FIG. 9A is a view in perspective from the medial side of a portion of the sole structure for the article of footwear of FIG. 1, including the midsole plate and lower midsole member of the midsole structure and the outsole structure.
Figure 9B:
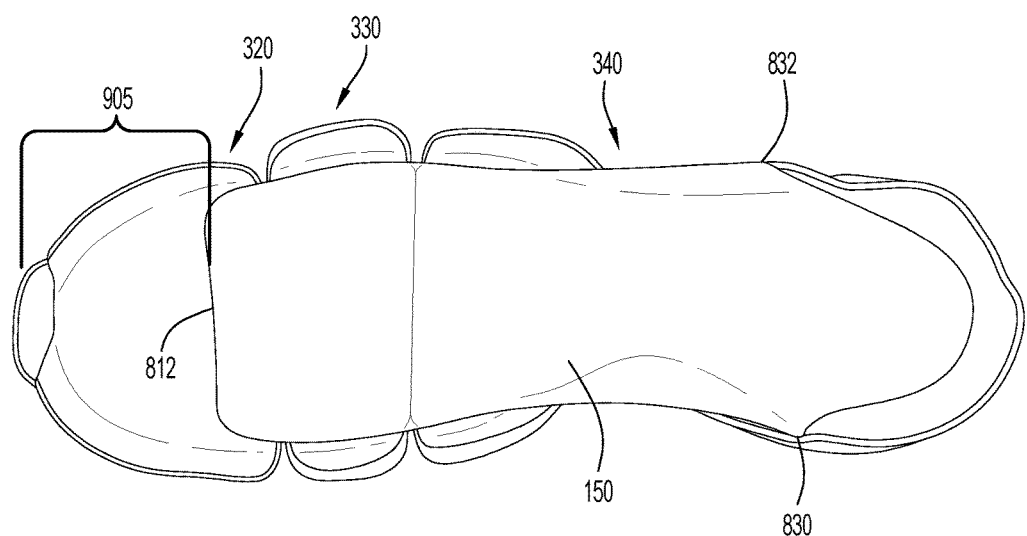
FIG. 9B is a top view in plan of the portion of the sole structure of FIG. 9A.

The midsole plate 150 is constructed of a substantially non-compressible, hard material so as to have a Shore A durometer that is greater than that of the outsole structure 170 (e.g., a Shore A durometer of about 60-80, such as a Shore A durometer of about 70-75). The midsole plate 150 also has a sufficient flexibility and/or spring-like characteristics along its length to absorb pressure points caused by flexing or bending of the lower midsole and/or outsole structure elements during use of the shoe 100. The midsole plate 150 comprises a thin plate (e.g., smaller in thickness than each of the upper and lower midsole members) having a suitable thickness. The midsole plate can be formed, for example, from suitably flexible and hard materials such as a polyamide (e.g., a polyamide of the formula $[(CH_2)_{11}C(O)NH]_n$ also referred to as PA 12 or nylon 12). In another example embodiment, the midsole plate can be formed from suitably flexible and hard materials such as a resin comprising carbon fibers and/or a resin comprising certain polymer materials such as a polyether block amide copolymer (e.g., copolymers commercially available under the trademark PEBAX®). The midsole plate 150 can further change in material composition along its length and/or transverse dimensions to effectively vary the elastic, spring-like characteristics along different portions of the plate. Referring to FIG. 8B, each of the exposed areas (i.e., visible from shoe bottom side 300) of the plate lower side 824 defined by flexure grooves 335, 345 and exposed area 823 can be covered with a laminate material to protect the plate from exposure to elements and enhance the durability and/or look and feel of the shoe 100.

Figure 5:
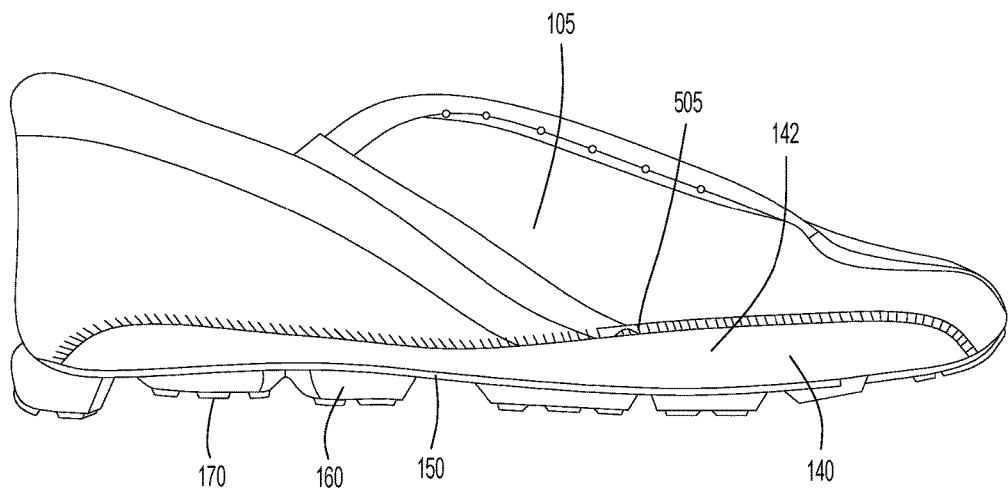
FIG. 5 is the cross-sectional side view in elevation of the article of footwear of FIG. 4A, with the upper midsole member removed to show the connection between strobel member and upper.
Figure 6:
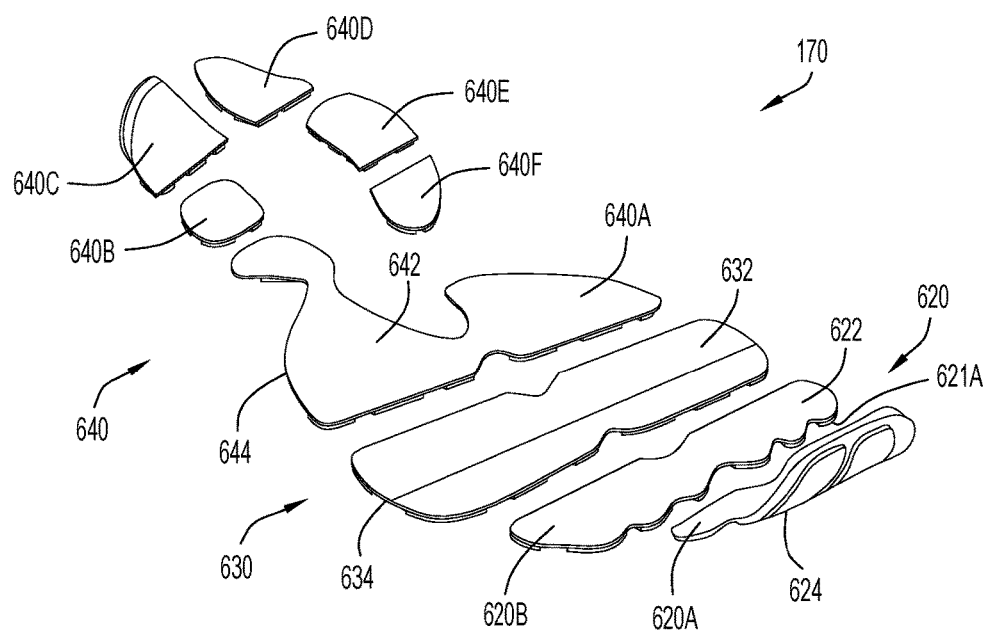
FIG. 6 is a front view in perspective of the outsole structure for the article of footwear of FIG. 1.

The strobel member 140 can be constructed of any suitable material (e.g., polyester or any other suitable textile material) that is configured to effectively secure the upper 105 to the sole structure 110. In example embodiments, the strobel member can be constructed of any one or more materials similar to those utilized to construct the upper 105, including conventional materials (e.g., woven or nonwoven textiles, knitted textiles, leather, synthetic leather, rubber, etc.). In example embodiments, the strobel member 140 can be constructed of the same or different textile material(s) as the upper 105. The strobel member 140 is secured (e.g., via adhesion, welding, melt bonding, etc.), at its lower side 144, to the upper side 842 of the midsole plate 150 and a portion of the upper side 722 of the lower midsole member 720 (at the gap 905 defined along the upper side 722 located forwardly of the front end 812 of the plate 150). Referring to FIGS. 1 and 5, the peripheral edge 146 surrounding the strobel member secures to a corresponding lower peripheral edge 107 of the upper 105 in any suitable manner. In the embodiments depicted in the figures, the strobel member peripheral edge 146 secures to the lower peripheral edge 107 of the upper via stitching 505.

Further comfort for the shoe 100 is facilitated by providing an upper midsole member 130 that engages the upper side 142 of the strobel 140 within the envelope or pocket of the upper 105. The upper midsole member 130 is constructed of a suitable lightweight (e.g., low density) compressible material, such as a foam material having a compressibility that is similar (e.g., about the same as) or less than the lower midsole member 160. For example, the upper midsole member 130 can be constructed of a compressible (e.g., foam) material having a Shore A durometer from about 36-47 (e.g., from about 38-45) and a density from about 0.860 g/cm³ to about 0.890 g/cm³. In an example embodiment, the upper midsole member 130 is formed of a non-EVA foam material. In other example embodiments, the upper midsole member 130 is formed of a foam material comprising one or more olefin block copolymers. Some examples of suitable olefin block copolymers are those that can include α-olefin multi-block interpolymers, where the α-olefins can include, without limitation, $C_3$-$C_{20}$ α-olefins (e.g., $C_3$-$C_{10}$ α-olefins), such as propylene, 1-butene, 1-pentene, 1-hexene, 1-heptene and 1-octene. Some specific examples of suitable olefin block copolymers that can be used to form some or all of the upper midsole member 130 are those commercially available under the trademark INFUSE™ (Dow Chemical Company). In further example embodiments, the upper midsole member 130 can comprise at least about 95% by weight of one or more olefin block copolymers (e.g., 95% by weight or greater of INFUSE™ olefin block copolymers).

Referring to FIG. 1, the upper midsole member 130 has a shape that generally conforms with the upper side 142 of the strobel member 140. The upper midsole member 130 includes a peripheral sidewall 136 that extends around the entire perimeter of the midsole member 130 and curves upward from the upper side 132 of the member 130 to conform with peripheral sidewall portions of the upper 105. Thus, the upper midsole member 130 has a generally arcuate cross-section transverse a lengthwise dimension of the member 130 with longitudinal end portions of the member 130 also curving upward. A portion of the peripheral sidewall 136 at its rear or heel end 138 (i.e., at a location corresponding with the shoe heel end 206) has a greater lengthwise dimension (i.e., extends further upward) in relation to other portions of the peripheral sidewall 136 so as to provide a cupping surface area surrounding portions of the user's midfoot and hindfoot, including the user's heel, when the shoe 100 is worn by the user. In particular, the peripheral sidewall 136 has its greatest lengthwise dimension (i.e., extends to the greatest extent in an upward direction from upper side 132) at the rear (heel) end 138 of the member 130, and the peripheral sidewall 136 further has its smallest lengthwise dimension (i.e., extends to the least extent in an upward direction from upper side 132) at its front (toe) end 139.

The upper midsole member 130 is not secured but instead is loosely held or frictionally fit within the upper 105 against the strobel member 140. The upper side 132 of the member 130 further has a contour that generally conforms with the bottom side of a user's foot, including a slight convex curvature at about the hindfoot region 206 or at a transition from the hindfoot region 206 to the midfoot region 204 that conforms with the arch of a user's foot. The thickness of the upper midsole member 130 can vary along its length (due to the varying contour along its upper side 132). In example embodiments, the upper midsole member can vary in thickness from about 8 mm to about 12 mm, where the upper midsole member has a greater thickness at locations corresponding with the midfoot and/or hindfoot regions 204, 206 of the shoe while having a reduced thickness at the forefoot region 202 of the shoe (e.g., the thickness of the upper midsole member at the forefoot region is less than its thickness at each of the midfoot and hindfoot regions).

Thus, the midsole structure 120 includes a plurality of cushioning layers (e.g., the upper midsole member and the lower midsole member), with the flexible and harder midsole plate being disposed (e.g., sandwiched) between the cushioning layers. The upper midsole member 130 provides cushioning between the user's foot and the midsole plate 150, while the lower midsole member 160 provides additional cushioning for the user's foot between the plate 150 and a ground-engaging surface. The plate 150, with its flexure grooves 335, 345, can be configured to optimize bending or flexing for the sole structure 110 at the forefoot region 202 of the shoe 100 while ensuring stability at the shoe hindfoot region 206 corresponding with the user's heel.

Referring to FIGS. 11 and 12A-12H, portions of the midsole plate 150 and upper midsole member 130 extend partially over the medial side 208 and lateral side 210 of the shoe 100 to a greater extent along some lengthwise portions of the shoe in relation to other lengthwise portions of the shoe. For example, the midsole plate 150 curves upwardly along medial and lateral sides 208, 210 of the shoe 100 at a portion of the midfoot region 204 (e.g., at a location that is proximate or slightly forward the foot arch of the user) and the hindfoot region 206 as indicated in the cross-sectional view of FIGS. 12E-12H, where the upward curvature of the plate 150 increases slightly in a direction from midfoot region to hindfoot region. As indicated by the cross-sectional view of FIG. 12H (taken at a location of the hindfoot region 206 that corresponds with apex 832 of the plate 150), the plate 150 curves upward a slightly greater extent (i.e., extends farther in an upward direction) along the lateral side 210 in comparison to its upward curvature along the medial side 208 at about the same location. The upper midsole member 130 also curves upward, at its peripheral sidewall 136, along both the medial and lateral sides 208, 210 of the shoe 100 at these same locations (as depicted in FIGS. 12G and 12H) to a greater extent in relation to its upward curvature at other, more forward locations of the shoe that (e.g., locations as depicted in FIGS. 12A-12D). The upward extension of the peripheral sidewall 136 of the upper midsole member 130 at the location of the rear or heel end 138 provides a "cupping" effect by surrounding portions of the user's heel at the heel end 138, thus providing enhanced cushioning and comfort as well as stability to the heel of the user's foot.

As can further be seen from the multiple transverse cross-sectional views 12A-12H taken at different locations along the length of the shoe 100, the lower midsole member 160 and outsole structure 170 have different configurations and can be asymmetrical at different transverse cross-sections of the shoe. This is due, at least in part, to the configuration and arrangement of the sole structure elements or pods 320, 330, 340 disposed at the bottom side 300 of the shoe 100, and in particular the configuration of pod 340 including an elongated lower midsole structure element 740 with an elongated portion 740B that extends along or adjacent with the edges that define the medial and lateral sides 208, 210 of the shoe 100 while leaving an exposed central area 823 portions of the midfoot and/or hindfoot regions 204, 206. The configuration of the pods 320, 330, 340 reduces the amount of midsole and outsole structure in relation to sole structure configurations for other (e.g., conventional) shoes. This configuration reduces the overall weight of the shoe, while still ensuring user comfort, stability, enhanced traction and performance of the shoe. The pod 340, which has a generally "C" shaped configuration, includes parts of elongated portion 740 corresponding with outsole structure elements 640A, 640B and 640C extending along the lateral edge portion 310 of the bottom side 300 and with a gap between parts of the pod 340 corresponding with outsole structure elements 640A and 640F such that part of the medial edge portion 308 (at a location that is near the arch or midfoot region 204 of the shoe) is not covered with the lower midsole structure and outsole structure elements (i.e., at the exposed area 823 of plate 150). In particular, the pod 340 extends along the entire edge of the lateral edge 310 from the midfoot region 204 and around the edge of the heel end 314, while then extending only partially around the medial edge 308 to an end (defined at structure element 640F) that is spaced from pod 330. This configuration leaves a portion of the medial edge 308 of the bottom side 300 exposed and/or defined by the plate 150 (as depicted in FIG. 3) which is continuous with the gap at exposed area 823 of the plate 150.

Thus, the embodiments described herein, which provide a reduction of midsole and outsole material for the shoe, also enhance the flexibility of the shoe to enable the user to maintain a natural gait while running.

In addition, the combination of features of the composition and structural configuration of the midsole plate 150 and pods 120, 130, 140 of the lower midsole member 160 and outsole structure 170, including flexure grooves strategically placed along the midsole plate lower side 824 and also along the lower sides 724, 734 and/or 744 of the lower midsole structures 720, 730, 740 as well as the reduced lower midsole member and outsole structure material provided at the bottom side 300 (e.g., to expose area 823 of the plate 150), facilitate a suitable degree of flexibility at a plurality of locations along the bottom side 300 of the shoe 100 to permit movements of the user's foot in accordance with the natural gait of the user.

In particular, the grooves 325 and 355A-355E can be configured to permit some degree of flexibility between outsole structure elements disposed on the first pod 320 and third pod 340. For example, grooves 355B and 355D on the lower midsole structure element 740 being aligned along line 1110 (as depicted in FIG. 11), combined with the midsole plate 150 having a relatively flat surface portion at the corresponding location along its lower side 824, result in features of the sole structure 110 being capable of bending or flexing analogous to a living hinge at line 1110 and at the hindfoot region 206 near the shoe heel end 214. This allows outsole structure elements 640C and 640D of the pod 340 to move separate and independent along line 1110 in relation to the other outsole structure elements 640A, 640B, 640E, 640F of the pod 340. In addition, groove 355C located between outsole structure elements 640C and 640D and extending along line 1120 (FIG. 11), combined with the midsole plate 150 having a relatively flat surface portion at this corresponding location along its lower side 824, results in bending or flexing of the sole structure 110 along line 1120 in an analogous manner as a living hinge. These features provide greater flexibility of the shoe when a user's foot performs certain heel strike movements, thereby enhancing the user's natural gait during use of the shoe.

The flexure grooves 325, 335 located along the lower side 824 of the midsole plate 150 at the forefoot and midfoot regions 202, 204 of the shoe 100 also permit a certain amount of bending or flexing of the sole structure 110 and between the pods 220, 230, 240. This provides greater flexibility of the shoe 100 in the forefoot region 202 in relation to the midfoot region 204 and/or hindfoot region 206 when a user's foot performs certain toe strike movements, thereby enhancing the user's natural gait during use of the shoe. For example, and as previously noted, the configuration of the sole structure 110, including flexure grooves 335, 345 along the midsole plate 150 and configurations of the lower midsole member 160 and outsole structure 170 at the bottom side 300 of the sole structure 110, provides for greater flexibility in the forefoot region 202 of the shoe 100 while maintaining stability in the shoe hindfoot region 206 corresponding with the heel of the user's foot.

The plate 150 is further configured to function elastically in a spring-like manner along its length to absorb pressure points along the outsole structure 170 and lower midsole member 160 so as to further enhance user comfort during use of the shoe 100. Further, the features of the upper midsole member 130, combined with the lower midsole member 160, with midsole plate 150 located (i.e., sandwiched) between upper and lower midsole members, provides a suitable comfort for the user during use of the shoe 100.

The shoe can be assembled in any suitable manner. In an example embodiment, the outsole structure 170 can be formed in any suitable manner (e.g., to include one or a plurality of layers as previously described herein), e.g., via any suitable molding and/or other process. Lower midsole structure elements as described herein and depicted in the figures can be formed from a blank comprising a suitable foam or other compressive material. The midsole plate can be formed from a suitably rigid (i.e., non-compressive) and flexible (e.g., flexible about its length) material having features as described herein and depicted in the drawings. Further, the upper midsole member 130, strobel member 140, and upper 105 can also be formed of suitable materials and having features as described herein and depicted in the drawings. The outsole structure 170, lower midsole member 160, midsole plate 150 and strobel member 140 can be consecutively aligned over each other and secured according to any suitable techniques such as those described herein. The upper midsole member 130 can be aligned over the strobel member 140, and the strobel member 140 secured with the upper 105 in the manner as described herein. The heel counter 115 can also be secured to the upper 105 in the manner as described herein.

Thus, the article of footwear of the present invention includes an upper and a sole structure. The upper defines a shoe cavity (e.g., when combined with the strobel member) configured to receive a human foot. The upper possesses a longitudinal length and a transverse width. The sole structure includes a first layer constructed of a first compressible material oriented above a resilient plate and a second layer constructed of a second compressible material oriented below the resilient plate. The first compressible material layer is disposed within the cavity defined by the upper. The first layer is continuous, extending continuously through the length of the upper (from the forefoot section, through the midfoot section, and to the rearfoot or hindfoot section). In an embodiment, the first layer floats within the cavity, being unsecured to the upper. The first compressible material may possess the same or different properties as the second compressible material. For example, the first compression material may possess a first compression value and the second compression material may possess a second, different compression value.

The second layer of compressible material layer is disposed outside of the cavity. The second layer is discontinuous, being located at longitudinally spaced locations along the upper. That is, the second layer is formed of individual segments or pods mounted along the bottom of the upper. The space between adjacent segments defines a primary flexure groove that exposes the resilient plate, thereby enabling unfettered flexure along the primary groove. In an embodiment, the second further layer includes secondary flexure grooves that encourage limited flexure within the second layer. The sole structure, then, includes two degrees of flexure: a primary flexure where the resilient plate is exposed and a secondary flexure where grooves are formed into the compression material.

The second compressible material layer may include one or more windows openings that expose the resilient plate. With this configuration, the second compressible material layer selectively permits flexure of the resilient plate, encouraging plate flexure in a predetermined pattern (e.g., to encourage pronation). That is, the second layer may be configured to permit flexure in certain directions while resisting flexure in others. In an embodiment, at least one segment of the second layer may extend beyond the resilient plate, spanning the plate and the upper (e.g., the strobel).

A previously noted, the resilient plate can be formed of woven carbon fibers combined with (e.g., laminated in) a polymer. Alternatively, the resilient plate can be formed from other suitably flexible and hard materials, such as a polyamide (e.g., PA 12 or nylon 12). The resilient plate is truncated, terminated proximate the vamp of the upper. The forward portion of the resilient plate may be generally flat (possessing a substantially flat transverse profile). The rearward portion of the resilient plate, however, may be substantially arcuate in shape. The bottom surface of the plate may further include ridges or nubs running transversely along each side of a flexure groove. The ribs act as shoulders or stops, preventing translation of the second compression material along the surface of the plate.

The sole structure may further include an outsole secured to the ground-facing surface of a second layer of compression material, where the outsole that is thinner than conventional outsoles, while being highly durable.

Thus, the sole structure 110 of the shoe 100 described herein provides features of adequate cushioning comfort via a plurality of cushioning layers (upper midsole member 130 and lower midsole member 160) while providing adequate flexibility and lightweight features for the shoe 100 based upon the configuration of the midsole plate 150 and by removal of midsole and outsole structure at locations of the shoe 100 without sacrificing performance of the shoe. In particular, the pod 340, while not covering a central portion of an area it surrounds on the shoe bottom side 300, ensures user comfort and the ability for the shoe to engage in heel strikes along both the medial and lateral sides along the midfoot and hindfoot regions of the shoe as a result of the lower midsole and outsole structure elements of the pod 340 being disposed along the bottom side lateral and medial edge portions 308, 310 at the such regions. The combination of features provided within the shoe sole structure 110 enhances the natural gait of a user during shoe performance (e.g., during jogging or running) by providing an effective combination of optimal cushioning and flex response along the various regions of the shoe, thus facilitating an effortless heel-to-toe transition during the stance phase of a gait cycle.

Figure 13:
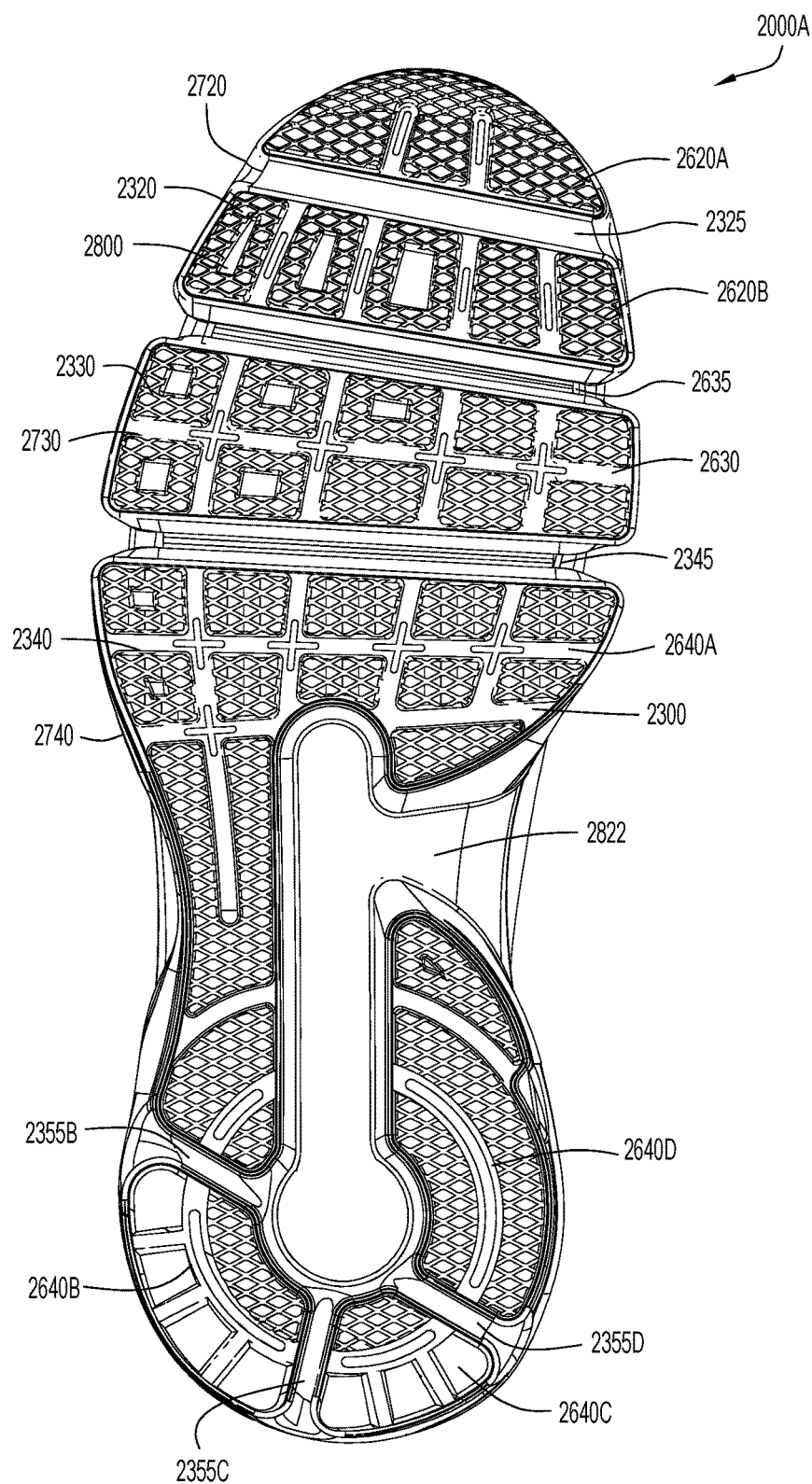
FIG. 13 is a bottom view in plan of an article of footwear including another embodiment of a sole structure in accordance with the invention.

Another embodiment of a sole structure for a shoe having features similar to those described for FIGS. 1-12 is now described with reference to FIG. 13. In this embodiment, the sole structure (like the sole structure previously described for FIGS. 1-12) includes an upper (e.g., floating) midsole, a midsole plate, a lower midsole member and an outsole structure constructed of similar materials, having similar hardness and/or flexibility characteristics and similar dimensions and oriented in the same stacked arrangement within the sole structure as the sole structure components of FIGS. 1-12. However, the lower midsole structure and outsole structure for the embodiment of FIG. 13 has been slightly revised. In particular, FIG. 13 depicts the bottom side 2300 of a shoe in which the lower midsole member 2160 includes a plurality of pods 2320, 2330 and 2340 that are separated from each other and arranged at similar locations along the shoe bottom 2300 as pods 320, 330 and 340 of the lower midsole member 160 are arranged along the bottom 300 of the shoe 100. The moderation plate 2150 of the sole structure (shown partially in FIG. 13) is substantially similar to moderation plate 150 of the sole structure of FIGS. 1-12 (extending from a heel end of the shoe to a location slightly forward of flexure groove 2335) and is exposed at the shoe bottom side 2300 at the locations of separation between pods 2320 and 2330 and pods 2330 and 2340, where the moderation plate 2150 includes grooves 2335 (located between pods 2320 and 2330) and 2345 (located between pods 2330 and 2340) that are similar in configuration and function as the flex grooves 335 and 345 formed in plate 150 as previously described herein (e.g., to allow for bending or flexing movements between the pods during use of the shoe). Similar to pod 320, pod 2320 comprises a plurality of outsole structure elements 2620A, 2620B of the outsole structure 2170 that are secured to a lower midsole structure element 2720 in any suitable manner (e.g., via adhesion, welding, melt bonding, etc.), and the lower midsole structure element 2720 includes a groove 2325 (similar to groove 325 of lower midsole structure element 720) disposed between elements 2620A and 2620B that allows a degree of flexure or bending movement between elements 2620A and 2620B.

The second pod 2330 of the sole structure of FIG. 13 has a similar configuration as the second pod 330 and (like second pod 330) extends in a lengthwise direction of the sole structure bottom side 2300 from a portion of the forefoot region that is at or near the metatarsal-phalangeal joints of the user's foot to a portion at or near the midfoot region of the shoe 2100. The second pod 2330 entirely covers the second surface area of the sole structure bottom side 300 and comprises an outsole structure element 2630 connected to a lower midsole structure element 2730 via any suitable securing structure (e.g., adhesion, welding, melt bonding, etc.).

The third pod 3340 of FIG. 13 also has a similar configuration as the second pod 340, extending in an elongated and curved manner along the lengthwise dimension of the sole structure bottom side 2300 and generally defining a "C" shaped pattern in which a portion of the midsole plate 2150 is exposed at a portion of the bottom side 2300 not covered by the third pod 3340. The third pod 3340 differs slightly from the previously described third pod 340 in the third pod 3340 includes fewer portions that are separated by indentations or flexure grooves within the bottom surface of the lower midsole structure element 2740. In particular, the lower midsole structure element 2740 includes a first portion 2640A that is similar in configuration as the combination of first and second portions 640A and 640B of the embodiment of FIGS. 1-12 (i.e., first portion 2640A extends over a footprint along the bottom side of the lower midsole structure element 2740 as the first and second portions 640A, 640B, with the exception that no flexure groove is provided for midsole structure element 2740 that corresponds with the groove 355A of midsole structure element 740). The third pod 3340 further includes a second portion 2640B that generally corresponds with third portion 640C of the embodiment of FIGS. 1-12 (with a groove 2355B defined between the first and second outsole structure elements 2640A, 2640B to permit a degree of bending or flexure these elements), a third portion 2640C that generally corresponds with the fourth portion 640D of the embodiment of FIGS. 1-12 (with a groove 2355C defined between the second and third outsole structure elements 2640B, 2640C to permit a degree of bending or flexure these elements), and a fourth portion 2640D that generally corresponds with the combination of fifth and sixth portions 640E, 640F of FIGS. 1-12 (i.e., fourth portion 2640D extends over a footprint along the bottom side of the lower midsole structure element 2740 as the fifth and sixth portions 640E, 640F, with the exception that no flexure groove is provided for midsole structure element 2740 that corresponds with the groove 355E of midsole structure element 740). A plurality of outsole structure elements 2640A-2640D are spaced from each other and connect with the lower midsole structure element 2740 via any suitable securing structure (e.g., adhesion, welding, melt bonding, etc.).

The traction elements or lugs 2800 of the outsole structure elements 2640A-2640D in the embodiment of FIG. 13 are of different configurations and shapes in relation to the lugs 1020A, 1020B for the embodiment of FIGS. 1-12. For example, the lugs 2800 can have any one or more shapes, such as polygonal (e.g., diamond) shapes, cross or "+" shapes, etc., where the lugs can be configured as having indentations and/or raised protrusions with such shapes.

Similar to the embodiment of FIGS. 1-12, flexure groove 2355B (located between outsole structure elements 2640A and 2640B) and flexure groove 2355D (located between outsole structure elements 2640C and 2640D) are aligned so as to be substantially collinear with each other along the bottom side 2300, thus defining a hinge-like flexure line the pod 2340 at a location proximate the bottom side heel end (e.g., at a similar location as flexure line 1110 in the embodiment of FIGS. 1-12).

Thus, while the configuration of the lower midsole structure and outsole structures of FIG. 13 are slightly different from those described in the embodiment of FIGS. 1-12, a shoe implementing the sole structure as depicted in FIG. 13 also provides features of reducing weight of the sole structure without sacrificing comfort to the user and also enhancing the natural gait of a user during shoe performance (e.g., during jogging or running) by providing an effective combination of optimal cushioning and flex response along the various regions of the shoe, thus facilitating an effortless heel-to-toe transition during the stance phase of a gait cycle.

While the invention has been described in detail and with reference to specific embodiments thereof, it will be apparent to one skilled in the art that various changes and modifications can be made therein without departing from the spirit and scope thereof.

For example, the sole structure can include any suitable combinations of layers in each of the midsole structure and the outsole structure, with any suitable individual and separate sole structure elements or pods being constructed of lower midsole elements and/or outsole elements and defined at the bottom surface of the shoe. The pods can have any suitable configurations and shapes as well as materials of construction that may be the same or different as other pods defined along the shoe bottom surface. Any suitable number of flexure grooves may be provided at any one or more locations along one or more pods to facilitate independent and separate movement of two or more sections of a single pod in relation to each other.

The midsole plate can extend the entire length or only a portion of the length of the shoe and can be constructed of one or more of the same materials or varying materials along its entire length. Any suitable number and types of flexure grooves can be provided along either side of the midsole plate to provide additional flexibility for the plate as well as facilitating bending movement of one pod in relation to another.

The upper midsole member can include any cushioning features to enhance comfort to the user, including one or more sections that enhance comfort and stability around a user's heel and/or ankle during use of the shoe.

Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

What is claimed:

1. A sole structure for an article of footwear, the sole structure comprising:
    a midsole structure and an outsole structure, wherein the midsole structure comprises a plurality of members arranged in layers within the midsole structure, the plurality of members comprising:
    a first cushion member comprising a first compressible material;
    a second cushion member comprising a second compressible material that connects with the outsole structure, wherein the second cushion member connects with the outsole structure to form a plurality of pods along a bottom side of the sole structure, each pod being separated a spaced distance from another pod; and
    a plate disposed between the first and second cushion members, wherein the plate is configured to bend at one or more specific locations along a length of the plate;
    wherein the bottom side includes a first pod separated a spaced distance from a second pod such that a portion of the plate is exposed along the bottom side between the first and second pods, and the exposed portion of the plate between the first and second pods includes a flexure groove extending along a surface of the plate that is transverse the length of the plate such that the plate is configured to bend at the flexure groove.

2. The sole structure of claim 1, wherein the bottom side of the sole structure further includes a third pod separated a spaced distance from the second pod such that a second portion of the plate is exposed along the bottom surface between the second and third pods.

3. The sole structure of claim 2, wherein the exposed second portion of the plate includes a second flexure groove extending along a surface of the plate that is transverse the length of the plate such that the plate is configured to bend at the second flexure groove.

4. The sole structure of claim 1, wherein the outsole structure comprises a plurality of outsole structure elements secured to the pods, and each of the outsole structure elements includes ground engaging members that extend from a bottom surface of the outsole structure element.

5. The sole structure of claim 4, wherein at least one pod includes a flexure groove disposed along a surface of the pod that separates a first group of outsole structure elements from a second group of structure elements located on the pod.

6. The sole structure of claim 4, wherein a pod includes first and second flexure grooves, each flexure groove is disposed along a surface of the pod that separates a first group of outsole structure elements from a second group of structure elements located on the pod, and the first flexure groove is separated from but substantially collinear with the second flexure groove.

7. The sole structure of claim 4, wherein a single pod continuously extends along the bottom side of the sole structure adjacent a portion of a lateral side, a heel side and a portion of a medial side of the sole structure while defining a central location between the lateral side portion and medial side portion that exposes a portion of the plate at the bottom side of the sole structure.

8. The sole structure of claim 1, wherein the first compressible material has a hardness value that is less than a hardness value of the second compressible material.

9. The sole structure of claim 8, wherein the plate has a hardness value that is greater than the hardness value of the second compressible material.

10. The sole structure of claim 1, wherein the first cushion member comprises a foam material including one or more olefin block copolymers.

11. The sole structure of claim 10, wherein the second cushion member comprises a foam material including ethylene vinyl acetate.

12. The sole structure of claim 1, wherein the plate comprises a polyamide material or a material including carbon fibers combined with a polymer.

13. The sole structure of claim 1, wherein the plate includes a portion that is substantially flat and a portion that is curved and has an arcuate shape in a dimension that is transverse a length of the plate.

14. The sole structure of claim 1, wherein the first cushion member includes a rear portion that corresponds with a heel end of the sole structure and curves upward from the sole structure bottom side to a greater extent at the heel end in relation to all other portions of the first cushion member.

15. An article of footwear comprising an upper and the sole structure of claim 1.

16. The article of footwear of claim 15, further comprising a strobel that connects with the upper, wherein the strobel is disposed between the first cushion member and the second cushion member.

17. A sole structure for an article of footwear, the sole structure comprising:
- a midsole structure comprising an outsole structure and a plurality of members arranged in layers within the midsole structure, the plurality of members comprising:
  - a cushion member comprising a compressible material that connects with the outsole structure at a bottom side of the cushion member, wherein the cushion member connects with the outsole structure at the bottom side of the cushion member to form a plurality of pods, and each pod is a spaced distance from another pod; and
  - a plate secured to a top side of the cushion member that is opposed to the bottom side, wherein the plate is configured to bend at one or more specific locations along a length of the plate;
- wherein a portion of the plate is exposed at a bottom of the sole structure at each spaced distance between pods, and at least one exposed portion of the plate includes a flexure groove extending along a surface of the plate that is transverse the length of the plate.

\* \* \* \* \*